United States Patent [19]

Johnson et al.

[11] Patent Number: 5,586,312
[45] Date of Patent: Dec. 17, 1996

[54] METHOD AND APPARATUS FOR USING AN INDEPENDENT TRANSACTION PROCESSING APPLICATION AS A SERVICE ROUTINE

[75] Inventors: Lucinda L. Johnson, Oakdale; Clayton A. Peltier, Chisago City; Scott H. Kuehn, St. Paul; William D. Frank, New Brighton, all of Minn.

[73] Assignee: Unisys Corporation, Blue Bell, Pa.

[21] Appl. No.: 321,347

[22] Filed: Oct. 11, 1994

[51] Int. Cl.$^6$ ................................................ G06F 15/00
[52] U.S. Cl. ............... 395/610; 395/200.03; 395/200.12; 395/326; 395/340; 364/DIG. 1; 364/282.1; 364/282.4; 364/284.4
[58] Field of Search ..................... 395/600, 155, 395/157, 200.12, 200.03, 155, 157; 364/DIG. 1

[56] References Cited

U.S. PATENT DOCUMENTS

| | | | |
|---|---|---|---|
| 5,095,421 | 3/1992 | Freund | 395/650 |
| 5,367,624 | 11/1994 | Cooper | 395/157 |
| 5,398,336 | 3/1995 | Tantry et al. | 395/600 |
| 5,404,523 | 4/1995 | DellaFera et al. | 395/650 |
| 5,408,619 | 4/1995 | Oran | 395/325 |
| 5,418,945 | 5/1995 | Carter et al. | 395/600 |
| 5,434,394 | 7/1995 | Roach et al. | 235/375 |

*Primary Examiner*—Thomas G. Black
*Assistant Examiner*—Jean R. Homere
*Attorney, Agent, or Firm*—Charles A. Johnson; Mark T. Starr

[57] ABSTRACT

A system is disclosed for using an independent transaction processing application as a service routine for a client application where the independent transaction processing application is programmed for independent input and output. The independent transaction processing application does not have be reprogrammed for usage as a service routine. A transaction manager provides transaction control for a service request from the client application. A display processing system manages input and output associated with processing the service request. A database management system that is used by the independent transaction processing application distinguishes whether the transaction manager or the independent transaction processing application is providing transaction control.

20 Claims, 12 Drawing Sheets

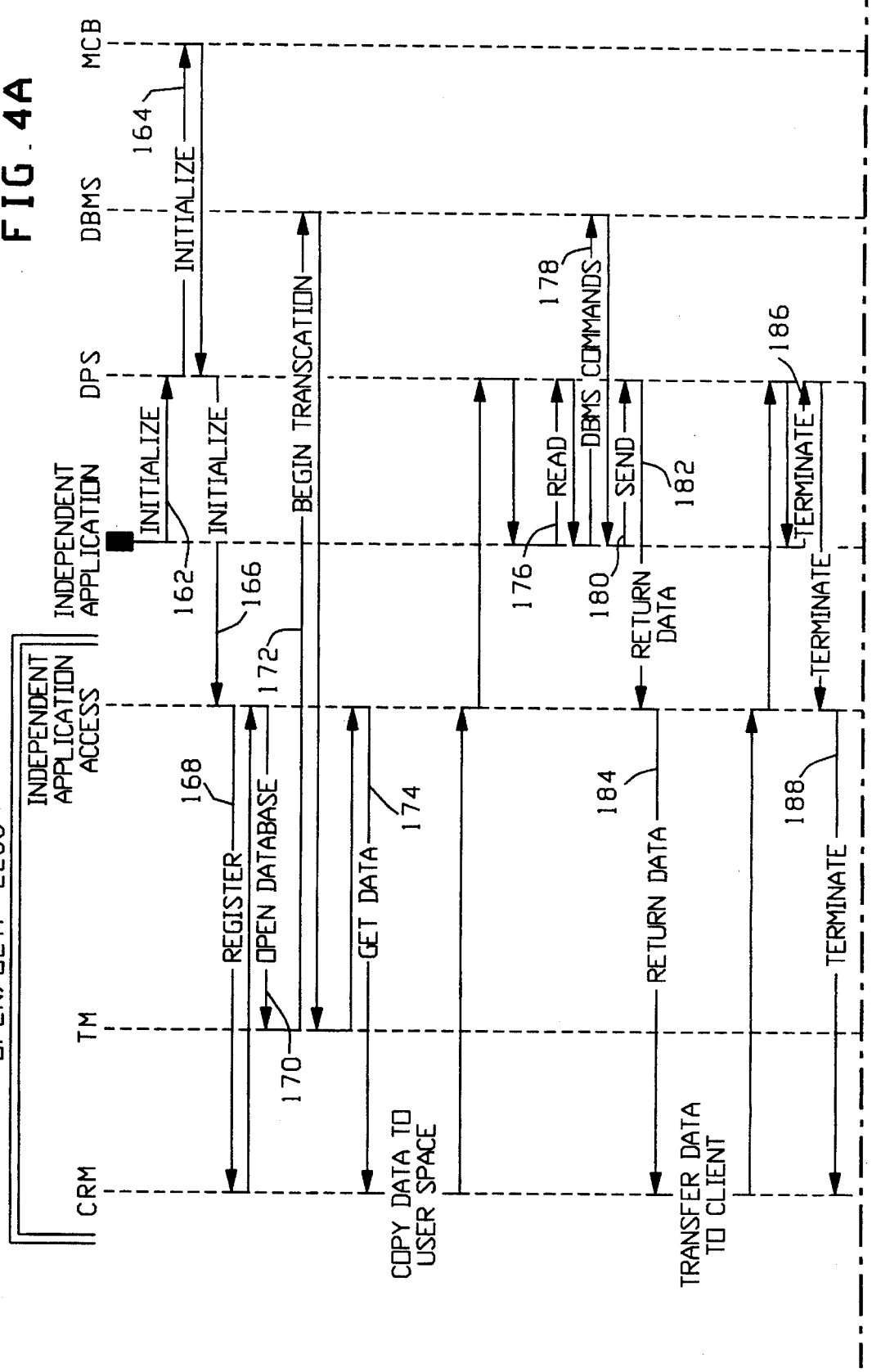

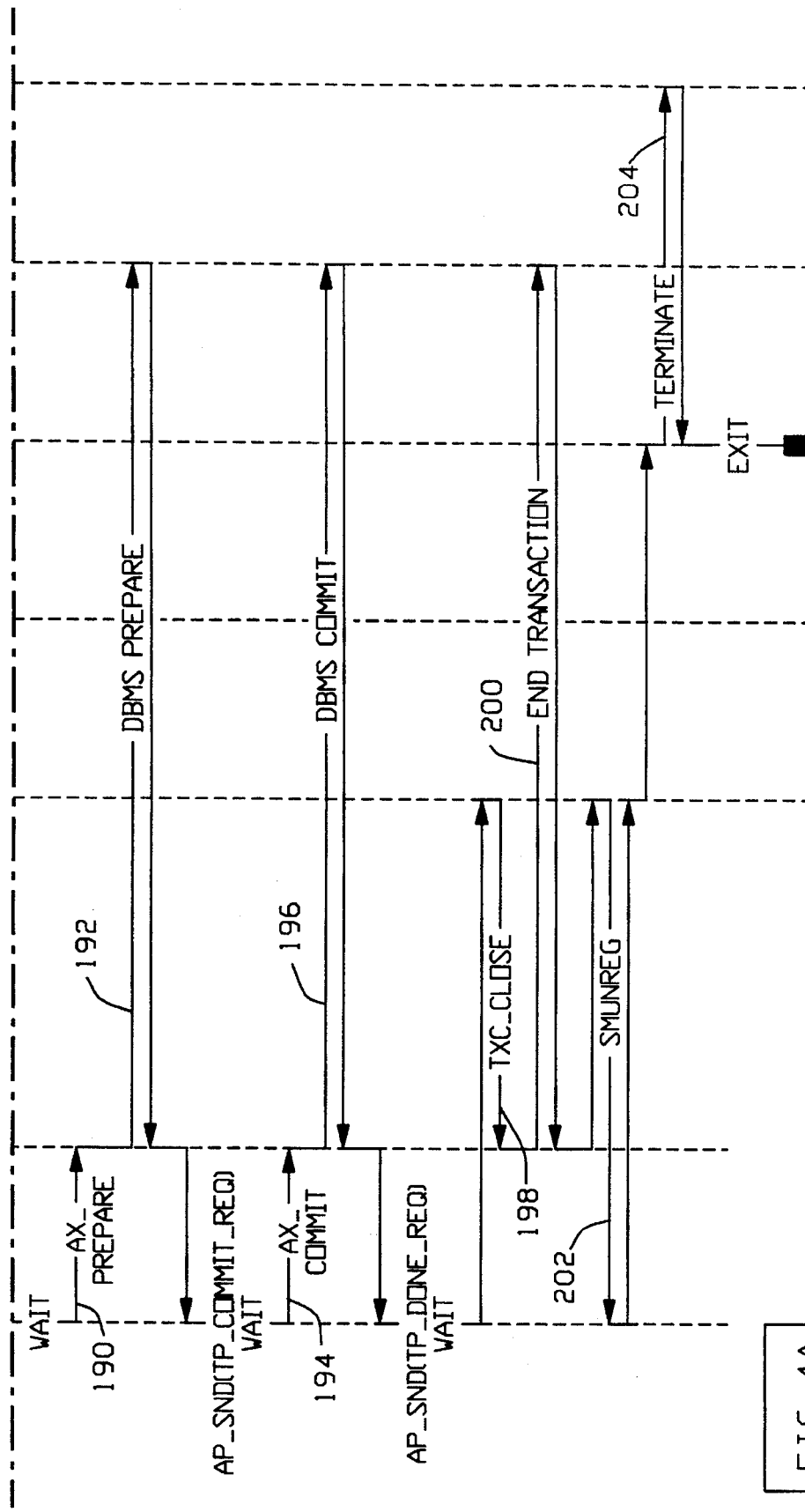
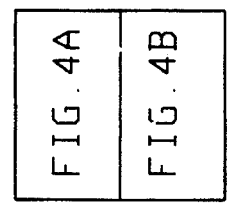
FIG. 4B
FIG. 4

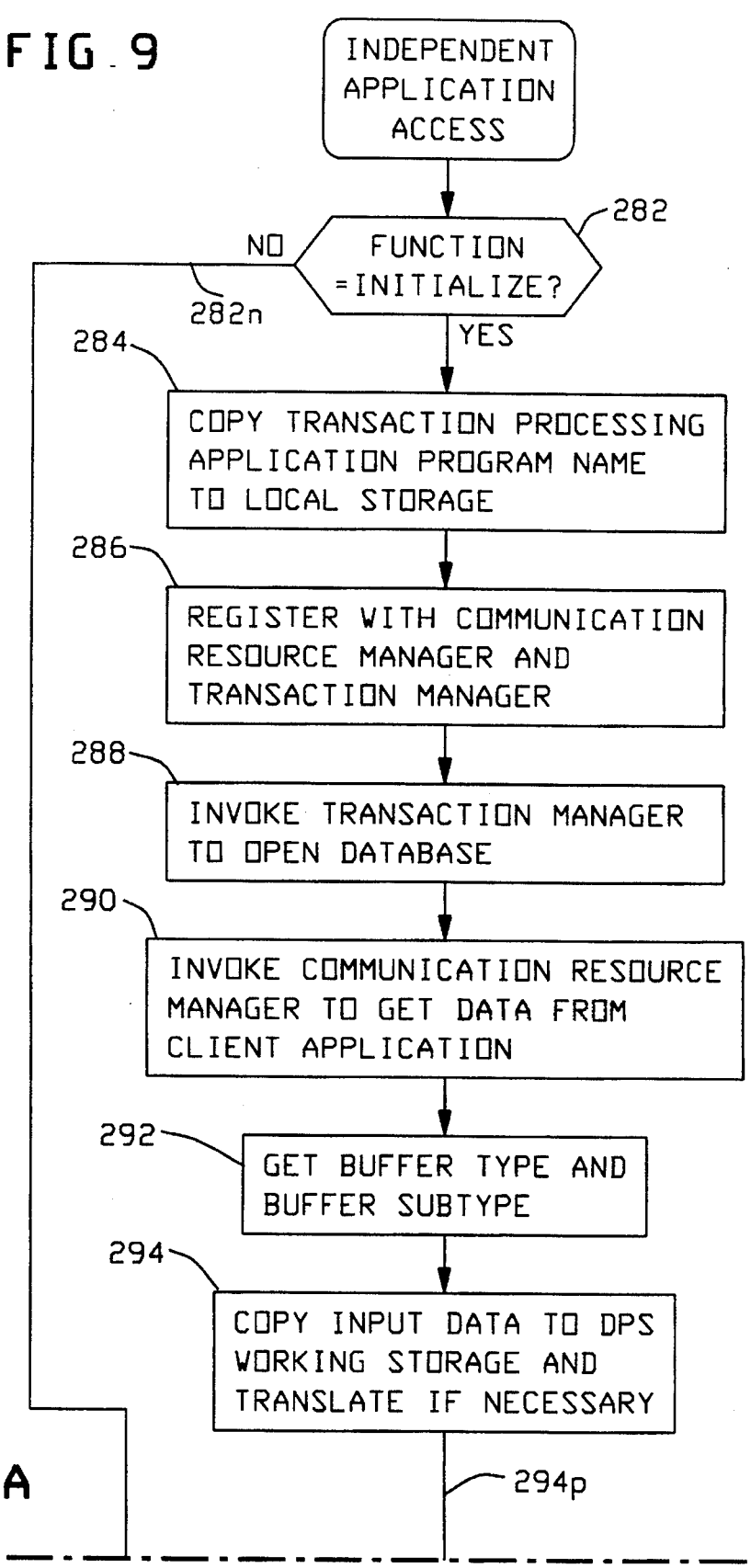

METHOD AND APPARATUS FOR USING AN INDEPENDENT TRANSACTION PROCESSING APPLICATION AS A SERVICE ROUTINE

BACKGROUND

1. Field of the Invention

This invention generally relates to distributed transaction processing, and more particularly to the interoperation between existing transaction processing application software programmed for processing non-global transactions and transaction processing application software programmed for processing global transactions.

2. Description of the Prior Art

Advances in hardware and software technology, in combination with new computing models, are expanding the possible functionality for On-line Transaction Processing (OLTP) application software.

On-line Transaction Processing (OLTP) is a style of data processing in which users at terminals or workstations send messages to application programs which update databases in real time. This is in contrast to batch or queued processing of transactions where the transactions are processed at a later time. An example of an OLTP application is an airline reservation system.

A transaction may be thought of as a set of actions performed by a transaction processing system wherein the actions together exhibit the properties of Atomicity, Consistency, Isolation, and Durability (ACID). The following definitions are given in *Transaction Processing: Concepts and Techniques* by Jim Gray and Andreas Reuter, Morgan Kaufmann Publishers, Inc., 1993, p. 6:

Atomicity. A transaction's changes to the state are atomic; either all happen or none happen. These changes include database changes, messages, and actions on transducers.

Consistency. A transaction is a correct transformation of the state. The actions taken as a group do not violate any of the integrity constraints associated with the state. This requires that the transaction be a correct program.

Isolation. Even though transactions execute concurrently, it appears to each transaction, T, that other transactions execute either before T or after T, but not both.

Durability. Once a transaction completes successfully, (commits), its changes to the state survive system failures.

To maintain the properties identified above, at the beginning of processing a transaction, a transaction processing application invokes a Begin_Transaction function to indicate processing of a transaction has begun. This operation is typically logged to an audit file to demarcate the operations associated with a particular transaction. Following the Begin_Transaction function, the other functions associated with the application defined transaction are performed and are also logged to an audit file. If all operations associated with a transaction complete successfully, a Commit function is invoked to make permanent any state changes that have occurred as a result of the transaction. The Commit operation is logged to the audit file to indicate that all operations have completed successfully. If an error occurs during processing of the transaction and a Commit operation is not performed, a Rollback function is invoked to undo the effects of the operations performed in processing the transaction.

The Client/Server computing model provides a framework in which the functionality of transaction processing applications may be expanded. Under the traditional mainframe transaction processing application model, the user interface, application control, and data management control all execute on a single data processing system. Under the traditional model, the transaction processing application will be referred to as a terminal based or an independent transaction processing application. The transaction processing application is terminal based because it expect to receive input from and directs output to a terminal. The transaction processing application is independent because it maintains transaction control independent of other applications. Generally, the Client/Server computing model involves a Client application submitting service requests to a Server application, and the Server application processing the requests and returning responses to the Client. Thus, a Client/Server environment has the user interface, application control, and dam management control distributed among two or more data processing systems. The Server applications must contain data management components and may also provide some functions of other components.

One widely used scheme for classifying Client/Server type systems is according to how they distribute user interface, application, and data management components between the Client and Server data processing systems. Two examples include the remote presentation type Client/Server application and the distributed data processing Client/Server application. In a remote presentation application, all the user interface functionality resides on the Client system and all other functionality resides on the Server system.

For a distributed data processing Client/Server system, the data management functionality is divided between the Client and Server systems. All other functionality is placed on the Client system. The distributed data processing Client/Server model allows databases to be split among multiple systems and fosters development of distributed transaction processing applications.

Transaction processing in a Client/Server environment may be either non-global or global. In a non-global client/server transaction, the same work takes place as in a traditional transaction, but the work is distributed in a Client/Server manner. For example, a travel agent may request an airline reservation via a workstation Client application that has a graphical user interface. The Client application communicates with a Server application that manages the reservation database. The server program updates the database, commits or aborts its own work, and returns information to the Client application, which notifies the travel agent.

A global transaction consists of multiple, coordinated database updates, possibly occurring on different computers. Global transactions are used when it is important that all databases are synchronized so that either all updates are made or none are made. Continuing with the previous example, the travel agent may also need to reserve a rental car and hotel room. The customer who is traveling wants to make sure that all reservations are coordinated; if a flight is unavailable, the hotel and car reservations are not needed. For the purpose of illustrating a global transaction, the airline, car, and hotel databases are on different transaction processing systems.

The global transaction begins when the travel agent requests the reservation from a workstation Client application with a graphical user interface. The client program contacts three Server applications on different transaction processing systems. One Server application books a flight, another reserves a car, and the third makes a hotel reservation. Each of the Server applications updates its respective database. The transaction processed by each of the Server applications may be referred to as a subordinate transaction of the global transaction. A global transaction manager coordinates the updates to the three databases, and a subordinate transaction manager on each of the individual transaction processing systems coordinates locally with the Server applications. The Server applications return information to the Client application.

A major advantage of global transaction processing is that tasks that were once processed individually are processed as a group, the group of tasks being the global transaction. The database updates are made on an all or nothing basis. For example, if an airline seat is not available, the hotel and car reservations are not made. Thus, with a global transaction, tasks that were once performed independently may be coordinated and automated.

As with non-global transactions, global transactions must possess the ACID properties. In order to preserve the ACID properties for a global transaction, the commit processing is modified to a two-phase commit procedure. Under a two-phase commit, a global transaction manager first requests that each of the subordinate transaction managers prepares to commit their updates to the respective databases. If all the local transaction managers respond that they are prepared to commit, the global transaction manager sends a commit request to the local transaction managers. Thus the two parts of the two-phase commit are prepare to commit the database updates and commit the database updates.

Businesses are typically confronted with the competing goals of minimizing their cost of doing business and providing a level of service that is competitive. In today's world, this may be played out in a business seeking to maximize its return on past investment in technology, such as terminal based and independent transaction processing applications, and considering investment in new technology, such as a global transaction processing applications, in order to stay competitive. An independent transaction processing application, such as the airline reservation system mentioned above, represents a sizable investment for a business. To reengineer an entire software system would be extremely expensive, and may present a substantial risk to the day-to-day business operations. Therefore, what is needed is a way to continue to take advantage of the sizable investment in existing independent transaction processing applications and at the same time exploit new technologies and computing models to create enhanced transaction processing applications to be able to compete effectively.

SUMMARY OF THE INVENTION

Therefore it would be desirable to use an independent transaction processing application as a service routine for a client application without having to reprogram the transaction processing application.

It is an object of the invention to use an independent transaction processing application as a service routine for a client application without having to reprogram the independent transaction processing application.

A further object is to use an independent transaction processing application as a service routine for a client application in combination with using the transaction processing application with a terminal for input and output.

Another object is to automatically establish the client application as the source of input for and the destination of output from the transaction processing application.

Yet another object is to automatically establish transaction control by the client application for the service request whereby transaction control initiated by the transaction processing application is selectively disregarded.

A further object of the invention is to use an independent transaction processing application as a service routine for a client application in combination with using the transaction processing application with a terminal for input and output, and automatically establishing transaction control by the client application for service requests from the client application and transaction control by the transaction processing application for transactions initiated from the terminal.

According to the present invention, the foregoing and other objects and advantages are attained in a data processing system having an independent transaction processing application coupled to a database management system. A client application generates a service request for processing by the transaction processing application. A transaction manager is coupled to the database management system and to the client application for managing processing of the service request. The transaction manager initiates processing of the service request by the independent transaction processing application and establishes transaction control for processing the service request with the database management system. Once the transaction manager establishes transaction control for the service request, the database management system selectively disregards transaction control commands issued by the transaction processing application.

Input to and output from the transaction processing application is managed by a display processing system. The transaction manager is coupled to the display processing system and establishes that the client application is the source of input for and the destination for output from the independent transaction processing application when processing a service request.

A terminal is coupled to the display processing system. The terminal initiates a transaction to be processed by the independent transaction processing application and provides input for and receives output from the transaction processing application in processing the transaction. The display processing system distinguishes between a service request from the client application and a transaction initiated from the terminal. For a transaction, the display processing system obtains input from and directs output to the terminal. For a service request, the display processing system obtains input from and directs output to the client application.

The database management system also distinguishes between processing of a transaction initiated from the terminal and a service request initiated from the client application. For processing a transaction, the database management system processes transaction control commands issued by the transaction processing application. For a service request, the database management system selectively disregards transaction control commands issued by the transaction processing application and processes transaction control commands issued by the client application.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the spirit and scope of the invention. Accordingly, the drawings and description are to be regarded as illustrative in nature, and not as restrictive.

BRIEF DESCRIPTION OF THE DRAWINGS

FIG. 4 illustrates the flow of control when an Independent Transaction Processing Application is used as a service routine by a Client Application;

FIG. 9 illustrates the relationship between FIGS. 9A and 9B;

FIGS. 9A and 9B are a flowchart of the processing performed by the Independent Application Access software;

DETAILED DESCRIPTION

Figure 1:
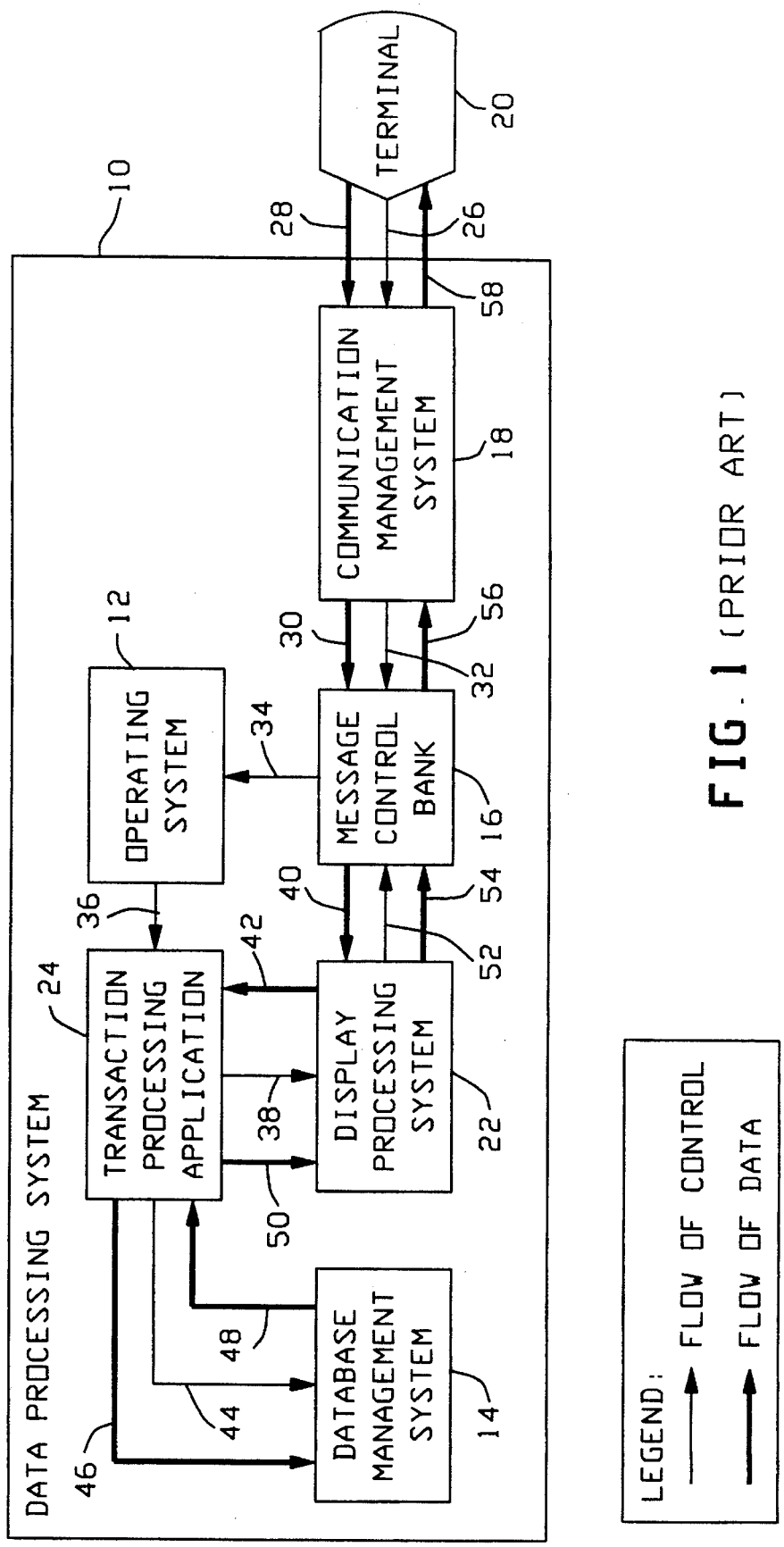
FIG. 1 is a block diagram that shows the flow of control and flow of data between the functional components in an exemplary prior an on-line transaction processing system.

FIG. 1 is a block diagram that shows the flow of control and flow of data between the functional components in an exemplary prior an on-line transaction processing system. A general purpose Data Processing System 10, such as a 2200/900 Series data processing system from Unisys Corporation provides the overall computation and input/output services to the on-line transaction processing system. An Operating System 12, such as OS 2200 from Unisys manages the resources of the Data Processing System and makes them available to application software. Components within the exemplary Operating System provide for control lo of transaction processing.

The Database Management System (DBMS) 14 is a software system that manages access to shared database resources. In the prior art transaction processing environment, the DBMS did not support the two-phase commit protocol. Software products such as Data Management System 2200 (DMS 2200) and Relational Data Management System 2200 (RDMS 2200) provide the DBMS capabilities in the prior art system described herein.

The Message Control Bank (MCB) 16 is a message handler for the OS 2200 transaction processing software (not shown) that provides message queuing, recovery, staging, and auditing. Data communications between software that is resident on an 2200 Series data processing system and the communications software that is outside the data processing system, such as for terminals and other data processing systems is provided by the Communication Management System 2200 (CMS 2200) 18. The Terminal 20 is the hardware device through which a user inputs data to and receives output data from the on-line transaction processing system. Processing of a transaction is initiated with input from the Terminal to the MCB.

The Display Processing System 2200 (DPS 2200) 22 is a software system that manages display-oriented transactions in an on-line transaction processing environment under OS 2200. DPS 2200 provides facilities to define forms (screen templates), user profiles, security, and test environments. The functions provided by DPS 2200 are available to transaction processing application software.

The Transaction Processing Application 24 is a software application that has been written to execute and interoperate with the Operating System 12, DBMS 14, MCB 16, CMS 18, and DPS 22. The Transaction Processing Application is not programmed to process transactions that are subordinate to a global transaction and therefore does not conform to the two-phase commit procedures.

The flow of control and data in the prior art on-line transaction processing system is illustrated by the directional lines between the blocks. A user enters dam at a Terminal 20. The data entered at the Terminal is prefixed with six characters that identify the transaction processing program to be invoked. Control Line 26 shows the transfer of control from the Terminal to the CMS 18, and data flow Line 28 shows the transfer of data from the Terminal to the CMS. The input data is provided to the MCB 16 as shown by data flow Line 30, and control is passed from CMS to MCB as shown by control Line 32. MCB in turn invokes the transaction processing software that is part of the Operating System 12 as shown by control Line 34. The six character transaction program identifier is also provided to the Operating System so that the appropriate program in the Transaction Processing Application may be invoked as shown by control Line 36.

The Transaction Processing Application 24 begins by invoking the DPS 22 to obtain the input data as shown by control Line 38. The DPS obtains the input data from the MCB 16 as shown by data flow Line 40, and the data is returned to the Transaction Processing Application as shown by data flow Line 42. In processing the transaction, the Transaction Processing Application invokes the DBMS 14 as shown by control Line 44 and passes input data to the DBMS as shown by data flow Line 46. The DBMS returns data to the Transaction Processing Application as shown by data flow Line 48, and the data in turn is provided to the DPS as shown by data flow Line 50. The DPS invokes the MCB as shown by control Line 52, and passes the output data as shown by data flow Line 54. The MCB in turn passes the output data to the CMS 18 for display on the Terminal 20 as is respectively illustrated by data flow Lines 56 and 58.

Figure 2:
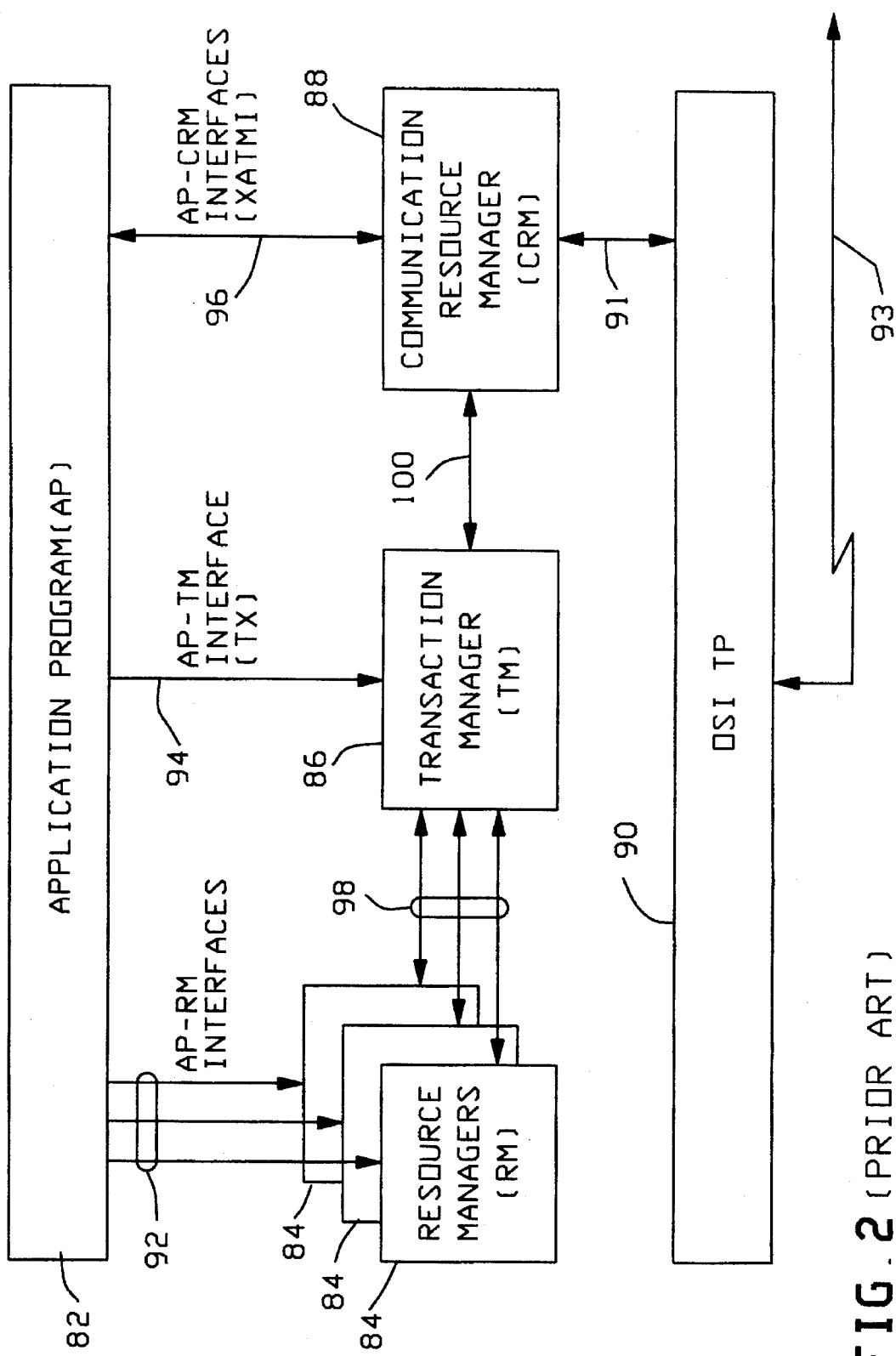
FIG. 2 is a functional block diagram of the prior an X/Open™ Open/OLTP Distributed Transaction Processing (DTP) architecture.

FIG. 2 is a functional block diagram of the prior an X/Open™ Open/OLTP Distributed Transaction Processing (DTP) architecture, referenced hereafter as "Open/OLTP". X/Open™ is a trademark of X/Open Company Limited.

Directional lines in FIG. 2 indicate the direction in which processing control may flow. The Open/OLTP model is a software architecture that enables multiple application programs to share resources and to participate in global transactions. The Open/OLTP model is more fully described in the *X/Open Guide, Distributed Transaction Processing Reference Model* as published by the X/Open Company Ltd., U.K.

The Application Program (AP) 82 is a user-defined software component that defines global transaction boundaries and specifies actions that constitute global transactions. It also provides access to one or more resources that are required by a transaction. In a global transaction, two or more APs perform their individual functions which when combined make up the global transaction. One of the APs will be the superior AP, that is the AP that starts and finishes the global transaction. The other APs will be subordinate. A hierarchy of APs may be established where a subordinate AP is superior to another AP.

Resource Managers (RMs) 84 provide access to resources for the AP 82. Database management systems and file access systems are examples of system software components that act as RMs.

The APs begin and end transactions under the control of a Transaction Manager (TM) 86. The TM is a system software component that assigns transaction identifiers to global transactions, monitors their progress, coordinates their completion, and coordinates failure recovery. The TM enforces the transaction property of atomicity. If a global transaction is being processed, the TM adheres to the two-phase commit transaction processing protocol.

Communication between APs 82 that are participating in global transactions, and communication between TMs 86 on different data processing systems are controlled by Communication Resource Managers (CRMs) 88. In Open/OLTP DTP, system software components that provide the underlying communication services that the CRMs require are defined in the Open System Interconnect Transaction Processing (OSI TP 90) standard which further defines the Interface 91. The Open/OLTP DTP model also supports proprietary communication protocols. Line 93 represents the interface for communicating between individual instances of the Open/OLTP DTP model.

In Open/OLTP DTP, APs 82 conduct global transactions by using interfaces that system software components provide. The interfaces include: AP-RM 92, AP-TM 94, and AP-CRM 96. The AP-RM interfaces include the RM provided interfaces that provide the APs with access to resources. Examples of AP-RM interfaces include the Structured Query Language (SQL) and the Indexed Sequential Access Method (ISAM).

The AP-TM interface 94 is provided by the TM to define global transaction boundaries. The AP-TM interface is also referenced as the TX interface. Further information on the TX interface is available in *Distributed Transaction Processing: The TX (Transaction Demarcation) Specification,* X/Open Company Limited, U.K., (1992).

The AP-CRM 96 interface is provided by the CRM 88 to AP 82. The AP-CRM interface is also referenced as the XATMI interface. The XATMI interface allows APs to communicate with other APs during the processing of global transactions. Additional information on the XATMI interface is available in *Distributed Transaction Processing: The XATMI Specification,* X/Open Company Limited, U.K., (1993).

The TM-RM interfaces 98 are similar to the AP-RM interfaces and are used for purposes of transaction control.

The TM-RM and TM-CRM interfaces are described further in XA Interface, *Distributed Transaction Processing: The TX (Transaction Demarcation) Specification,* X/Open Company Limited, U.K., (1992).

Figure 3:
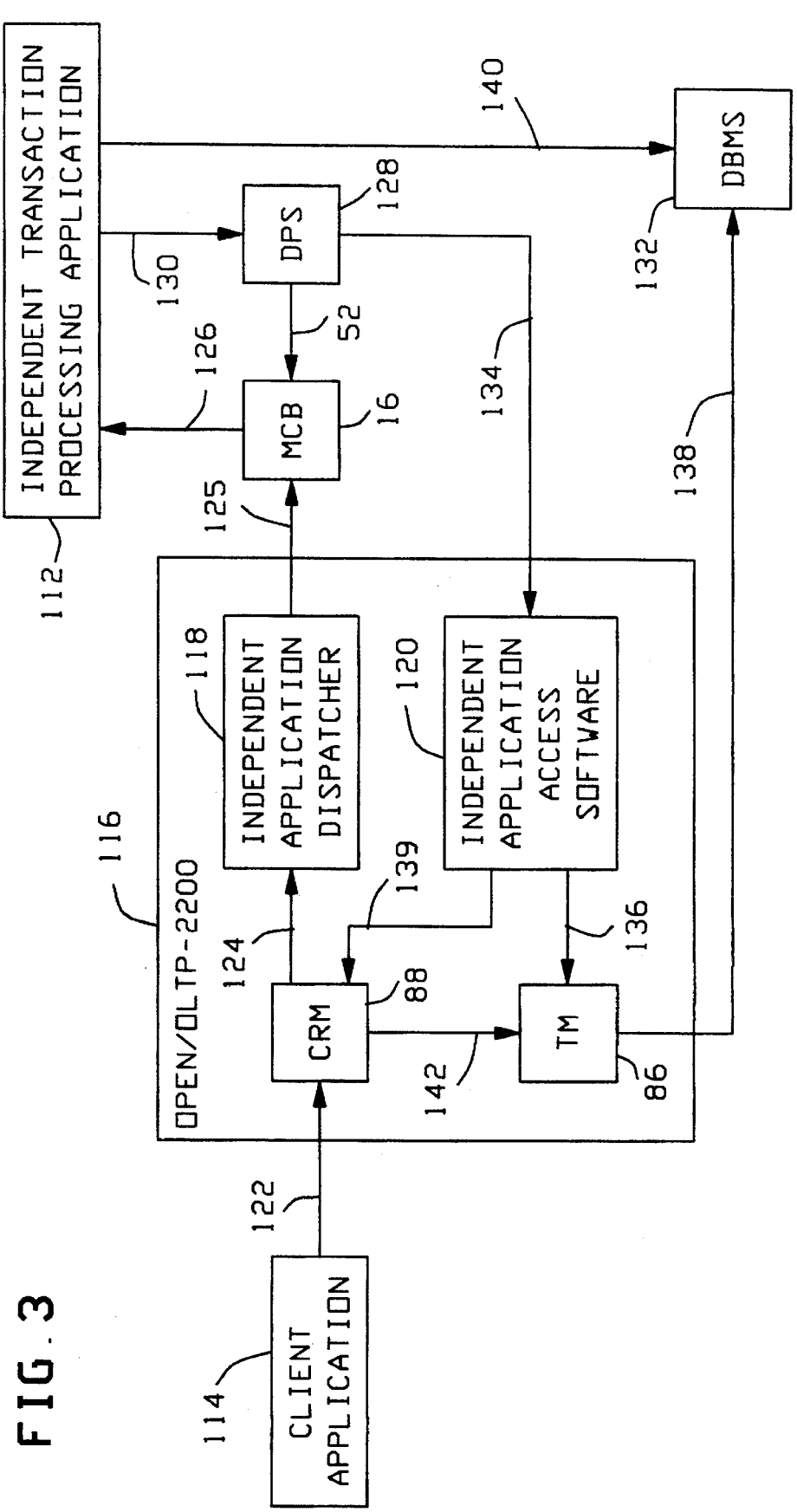
FIG. 3 is a functional block diagram of the software architecture that combines the Open/OLTP DTP architecture with a traditional on-line transaction processing architecture to enable Independent Applications to operate as Open/OLTP DTP service routines.

FIG. 3 is a functional block diagram of the software architecture that combines the Open/OLTP DTP architecture with a traditional on-line transaction processing architecture to enable Independent Applications to operate as Open/OLTP DTP service routines. This combined software architecture is referred to as the Independent Application Access Architecture. Directional lines in FIG. 3 illustrate the direction in which control may flow between the software components.

The Independent Application 112 is an independent transaction processing application that was originally programmed to interoperate with the transaction processing system software as described in FIG. 1. It is the same software as the Transaction Processing Application 24. The Independent Application Access Architecture allows the Independent Application to operate as a service routine for a Client Application 114. In the Independent Application Access Architecture, the software interfaces between the Independent Application and the system software components remain the same as under the traditional on-line transaction processing system architecture of FIG. 1. This allows the Independent Application to be integrated into an expanded transaction processing environment, such as global transaction processing or client/server systems, without having to reengineer the Independent Application.

The Open/OLTP-2200 116 software in the Independent Application Access Architecture includes the TM 86, CRM 88, Independent Application Dispatcher 118, and Independent Application Access 120 software components. The Open/OLTP-2200 software includes additional components that are not shown because they are beyond the scope of the present invention. Input requests for a service provided by an Independent Application 112 are received from a Client Application 114 over standards based communication interfaces as shown by control Line 122. While a single control Line 122 is shown connecting the Client Application to the CRM, it should be understood that the Client Application may be operating on a data processing system other than the data processing system on which the Independent Application executes. When the Client Application is operating on another data processing system, another instance of software implementing the Open/OLTP architecture would be operating on the data processing system of the Client Application, and control Line 122 would represent the additional software and hardware involved.

The CRM 88 component of Open-OLTP-2200 116 receives the service request from the Client Application and queues the service request to the Independent Application Dispatcher 118 as shown by control Line 124. The Independent Application Dispatcher in turn uses a configuration file to match the name of the service requested by the Client Application with a transaction code that is expected by the MCB 16. The contents of the configuration file are established before the Client Application requests a service of the Independent Application. In the transaction processing system of FIG. 1, the transaction code was provided to the MCB as input from the Terminal 20. In the Open/OLTP-2200 system, the Independent Application Dispatcher obtains the transaction code from the configuration file. The transaction code is provided to the MCB and the MCB in turn schedules execution of the Independent Application identified by the transaction code. Control Line 125 shows the Independent Application Dispatcher passing control to MCB, and control Line 126 shows control being passed to the Independent Application. Even though it is not shown in FIG. 3, it should be understood that control Line 126 represents the scheduling of execution of the Independent Application with the Operating System 12 as described for the Transaction Processing Application 24 of FIG. 1. The Independent Application Dispatcher also includes a terminal-type of *Open/OLTP-terminal* in the information it passes to the MCB.

The Independent Application 112 invokes a DPS 128, as shown by control Line 130 for the purpose of handling terminal input/output. The DPS 128 is different from the DPS 22 of the prior art in that DPS 128 solicits input and directs output to Open/OLTP-2200 116 for a terminal-type *Open/OLTP-terminal*. Control Line 134 shows DPS obtaining input for the Independent Application from the Independent Application Access software 120. The DPS also calls into the Independent Application Access software to initialize with DBMS 132, obtain input data, send output data, and terminate with the DBMS. Control Line 134 shows control from DPS to Independent Application Access. In response to requests from the DPS, Independent Application Access invokes the TM 86 for transaction control requests, as shown by control Line 136, and the TM in turn invokes the DBMS as shown by control Line 138. The Independent Application Access software invokes the CRM, as indicated by control Line 139 when the DPS has requested input. After completing DPS initialization, the Independent Application invokes the DBMS to perform database queries and updates, as shown by control Line 140.

Figure 13:
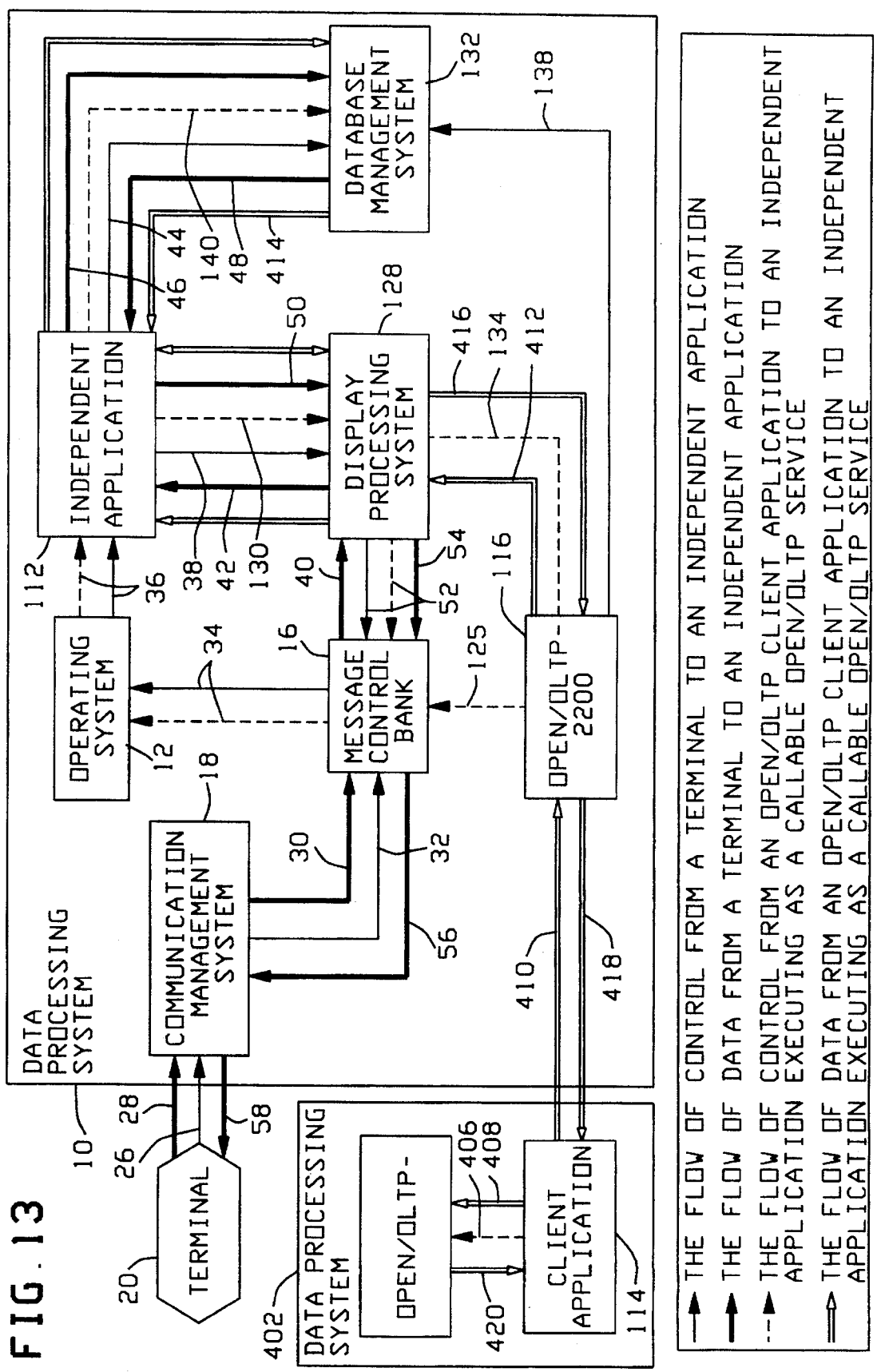
FIG. 13 is a block diagram that shows the flow of control and the flow of data between a first data processing system with a client application and a second data processing system with an Independent Application that is used both as a service routine for the Client Application and as a stand-alone application.

When the Independent Application 112 performs its processing as part of a global transaction, the TM 86 performs two-phase commit processing under the direction of a global transaction manager (part of Open/OLTP 404 in FIG. 13). The global transaction manager sends processing requests to the TM via the CRM 88. The CRM in turn invokes the TM as shown by control Line 142.

FIG. 4 illustrates the flow of control when an Independent Application is used as a service routine by a Client Application. Labeled horizontal directional lines represent the flow of control between the software components with the label indicating the operation to perform. Unlabeled horizontal directional lines represent a return of control from components. Solid vertical lines below a software component represent the processing performed by the components as a result of the operations specified by labels on the horizontal control lines.

One of the first operations performed by an Independent Application 112 is to invoke the DPS 128 with an Initialize function as shown by control Line 162. The DPS processes an Initialize function by invoking the MCB 16 with an Initialize. Control Line 164 shows the Initialize request to MCB. The Initialize request 164 to MCB is a request for input data. In the prior art system of FIG. 1, the input data is provided via a Terminal 20. Whereas in the Open/OLTP-2200 environment, the input data is provided by a Client Application 114. The MCB returns the terminal-type Open/OLTP-terminal to the DPS. The DPS saves the terminal-type for when the Independent Application invokes a DPS Read function.

The DPS then calls the Initialize function of the Independent Application Access software 120 as shown by control Line 166 if the DPS detects the terminal-type *Open/OLTP-terminal*. As part of the Initialize function, Independent Application Access software registers with the CRM 88, Opens a database, and obtains the input data from the CRM. Independent Application Access software invokes a Register function of the CRM as shown by control Line 168, to register the Independent Application with the CRM.

An Open Database function of the TM 86 is invoked at control Line 170. The TM provides the software interface for initializing with the DBMS 132. The TM translates the Open Database request from Independent Application Access software into a format expected by the DBMS and invokes a DBMS Open function to initialize transaction control by the DBMS and signal to the DBMS that the Transaction Manager Interface is *Open/OLTP*. Control Line 172 indicates the Begin Transaction function of the DBMS being invoked.

The last operation performed during the processing of the Initialize function by Independent Application Access software 120 is obtaining the input data. To obtain the input data, the CRM 88 is invoked with a Get Data function as indicated by control Line 174. In response, the CRM copies the input data to memory available to the DPS 128. After the input data is returned to the DPS, Control is respectively returned to Independent Application Access software, DPS, and the Independent Application.

The Independent Application 112 continues in its application specific processing and at control Line 176 invokes a Read function of the DPS 128 to read the input data. The DPS returns the requested input data and the Independent Application uses the input data in issuing various DBMS commands as indicated by control Line 178.

As part of its normal transaction processing, the Independent Application 112 issues a Commit command to the DBMS 132 when it has completed its processing. The Commit request would be issued as one of the DBMS Commands indicated in control Line 178. The processing of the prior art system of the commit request is not appropriate where the Independent Application is processing a service request generated by the Client Application. The service request may be part of a global transaction. If the DBMS committed the transaction when instructed to do so by the Independent Application, the ACID properties of a global transaction would not be preserved. Therefore, to allow Independent Applications to participate in global transaction processing without re-engineering the Independent Application, the DBMS ignores Commit requests generated by Independent Applications when the Independent Application is processing a service request from a Client Application. The DBMS ignores commit commands from Independent Applications when the Transaction Manager Interface *Open/OLTP* was specified for a transaction in the Begin Transaction operation to the DBMS.

At control Line 180 the DPS Send function is invoked to send data to the Client Application 114. If the terminal-type is *Open/OLTP-terminal*, the DPS 128 invokes the Return Data function of Independent Application Access software 120 as shown by control Line 182. The Independent Application Access software in turn calls into the CRM 88 with the Return Data, as indicated by Control Line 184 function so that the CRM can transfer the output data to the Client Application.

After control is returned to the Independent Application 112 and it has completed its processing, the Independent Application invokes a Terminate function at control Line 186 to terminate with the transaction processing system. If the terminal-type *Open/OLTP-terminal* is associated with the transaction, DPS 128 invokes the Independent Application Access software 120 with a Terminate function at control Line 188.

Independent Application Access software 120 invokes the CRM 88 with a Terminate function to terminate its session.

The CRM waits for a transaction control indicator from the global transaction manager before proceeding in its processing. In processing a global transaction, the CRM will receive either a Prepare, Commit, or a Rollback indicator. Assuming a Prepare indicator is received from the global transaction manager, the CRM invokes the TM 86 with the ax_prepare function as indicated by control Line 190. The DBMS 132 is invoked with the Prepare operation as indicated by control Line 192. The Prepare operation causes DBMS to prepare the database so that if the systems failed unexpectedly after the Prepare operation but before a Commit operation, the changes in the database caused by the transaction could either be recovered or rolled-back. Control is then returned to the CRM.

The CRM 88 invokes *ap_snd(TP_COMMIT_REQ)* to request a commit transaction control indicator from the global transaction manager and then waits for a transaction control indicator. If a commit transaction control indicator is received, the *ax_commit* function of the TM 86 is invoked as indicated by control Line 194. At control Line 196 the TM invokes the DBMS with the Commit function. The DBMS then makes the modifications to the database caused by the transaction visible to other transactions and returns control to the CRM. The CRM invokes *ap_snd(TP_DONE_REQ)* to request a done transaction control indicator from the global transaction manager. The global transaction manager will return a Done transaction control indicator to each of the CRMs involved in processing the global transaction once all the RMs (DBMSs in this example) have responded with a request for a Done indicator. The CRM waits until a Done indicator is received and then returns control to Independent Application Access software.

At control Line 198 the *TXC_CLOSE* function of the TM 86 is invoked by the Independent Application Access software 120. The *TXC_CLOSE* function causes the TM to terminate with the RMs (the DBMS 132 in this example). The TM invokes the DBMS Close function to issue the End Transaction command to the DBMS at control Line 200. This signals to the DBMS that the transaction will not request any more operations on the database. Control is then returned to the Independent Application Access software.

The SMUNREG function of the CRM 88 is invoked by the Independent Application Access software 120 at control Line 202. SMUNREG unregisters the transaction identifier () with the CRM. The CRM may then delete any control information for the transaction that it presently has stored. Control is then returned to the DPS 128 so that the rest of the processing for the Terminate function may be completed.

To complete processing of the Terminate function, the DPS 128 invokes the Terminate function of the MCB 16 as shown by control Line 204. The MCB then deletes all control information it has stored for the completed transaction. Upon return from the MCB, the DPS completes its processing.

In general, developing a Client Application for use with an Independent Application is similar to any other client development project and is beyond the scope of this invention. Differences arise in the area of input and output operations. These differences arise because the Client Application must provide input to and receive output from the Independent Application in the format and under the protocol for which the Independent Application has been preprogrammed. To understand the requirements of a Client Application in the exemplary embodiment, some DPS 128 background information is useful.

The DPS 128 uses a terminal record file to accumulate information that relates to or passes through a terminal during the processing of a transaction. There are four categories of information: (1) transaction processing conversational link flag, (2) user-id, (3) user fields, and (4) scratch area. However, in the Independent Application Architecture of FIG. 3, there is no terminal record file to accumulate this information. This is because the X/Open request/reply model on which the present invention is based provides for a single input and a single output. Some of the information that would normally accumulate in the terminal record file does so over the course of multiple input/output operations.

Because the prior art mechanism for obtaining terminal information is unavailable in the Open/OLTP DTP environment, an input packet is used instead of the terminal record file when the terminal-type is *Open/OLTP-terminal*. Therefore, if the Independent Application uses the terminal record file information as accessed via the DPS 128, the same terminal information must be included in the input packet that is generated by the Client Application.

The transaction processing conversational link flag in the terminal file record is set when one transaction places the transaction code for the next transaction to execute in the terminal record file. This causes the next transaction code to execute immediately upon termination of the first. This linkage may extend many levels until the main transaction is executed. The Client Application developer may decide how much processing should be done by the Client and how much by the Independent Application. The Independent Application should be examined to determine whether and how the transaction processing conversational link flag is used.

The user-id is used with the DPS 128 to provide form-level and field level security for forms controlled by the DPS. The user fields are five twelve-character ASCII fields in the terminal record file. The scratch area is an unstructured data storage area in the terminal record file. The Independent Application will indicate the level of security, the user fields required, and whether the scratch area is used. The Independent Application will dictate what information must be passed to the DPS.

Even though the input provided to the Independent Application 112 from a Client Application 114 must be the same as input provided by the Terminal 20, the input is termed differently because of the nature of use of the Independent Application. Input from a Client Application to the Independent Application is called a service request in keeping with the client/server model. Transaction control for processing a service request is performed by the Client Application, not the Independent Application. Input from a Terminal to initiate the Independent Application is referred to as a transaction because transaction control for the Terminal provided input is performed by the Independent Application.

For the purposes of describing the present invention, the DPS 128 will be described in terms of its four basic functions: Initialize, Read Data, Send Data, and Terminate. The processing for each of the four functions has been modified such that an Independent Application may perform its processing as part of a global transaction, even though it has not been specifically programmed to participate in a global transaction. The four functions described may be invoked by the Independent Application 112.

Figure 5:
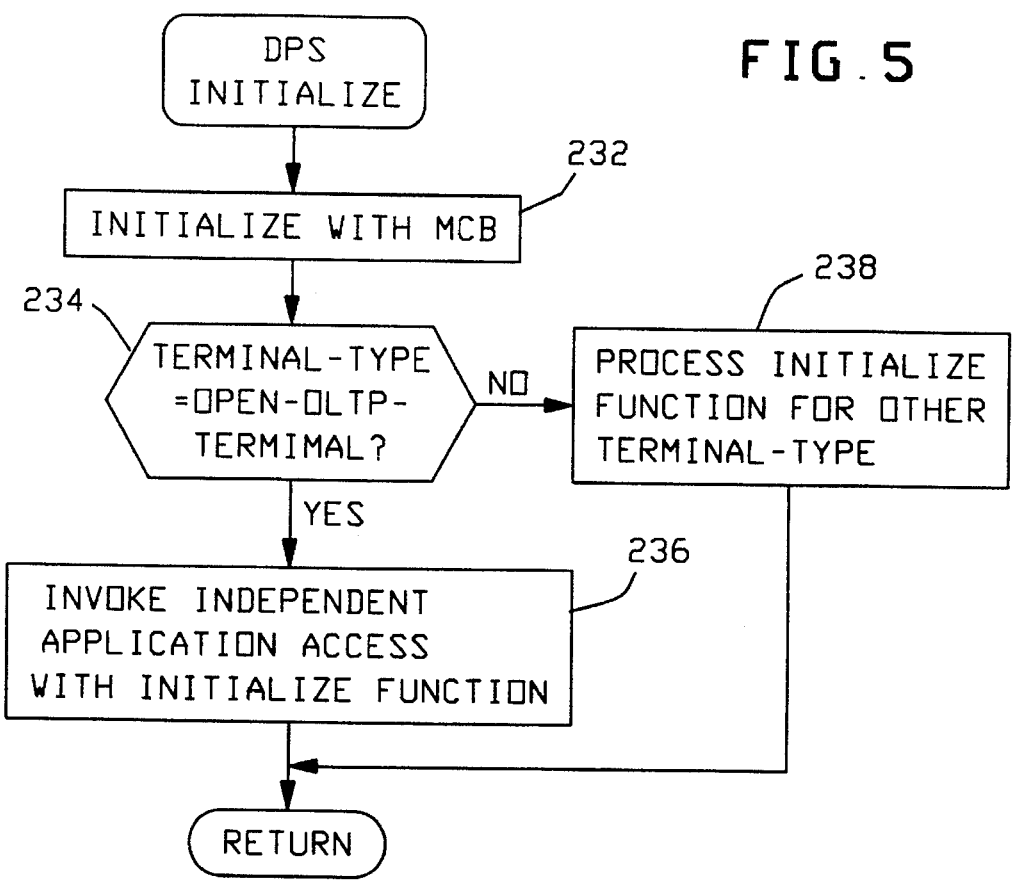
FIG. 5 is a flowchart of the processing performed by the Display Processing System (DPS) Initialize function.

FIG. 5 is a flowchart of the processing performed by the DPS Initialize function. The DPS Initialize function obtains the input data for later use by the Independent Application 112. Step 232 initializes with the MCB. The MCB 16 returns any input data and the terminal-type that indicates the type of terminal from which the data was input. The Independent Application Dispatcher 118 supplies the terminal type *Open-OLTP-terminal* to the MCB.

If the terminal-type is Open-OLTP-terminal, decision Step 234 directs control to Step 236. Step 236 invokes the Independent Application Access software 120 with the Initialize function. Independent Application Access software in turn registers with the Transaction Manager and opens any required databases. Independent Application Access software returns with the address of the input data from the Client Application Program. If the terminal-type is other than *Open-OLTP-terminal*, the initialize request is processed according to the specified terminal-type as shown by Step 238. Upon completion of Initialize processing, control is returned to the Independent Application 112.

Figure 6:
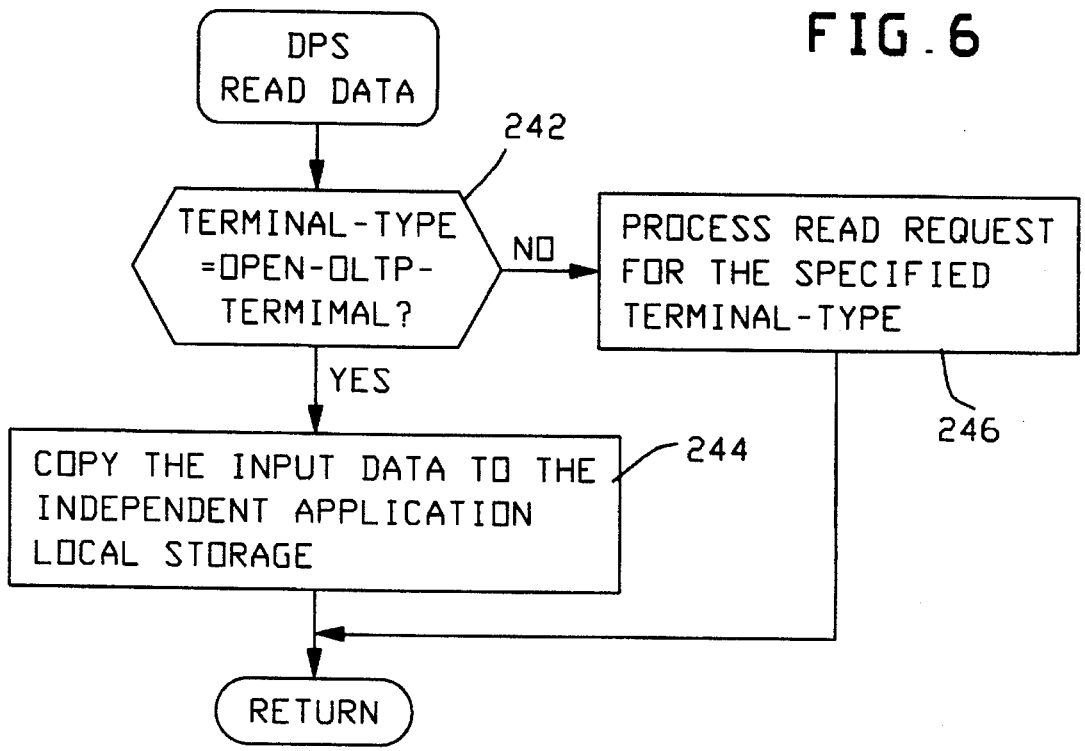
FIG. 6 is a flowchart of the processing for the Read function of the DPS.

FIG. 6 is a flowchart of the processing for the Read function of the DPS. The Read function is normally invoked by a transaction processing application to obtain screen data that a user input from a Terminal 20. If the Independent Application 112 is participating in a global transaction, the input data will be provided from a Client Application 114 instead of a Terminal. Recall that the DPS has the screen data available in its local storage as a result of the Initialize function.

If the terminal-type associated with the input data is *Open-OLTP-terminal*, decision Step 242 directs control to Step 244. Step 244 copies the input data to the local storage of the Independent Application 112. If the terminal-type is other than *Open-OLTP-terminal*, Step 246 processes the request according to the terminal-type specified. The difference between the processing of input data where the terminal-type is *Open-OLTP-terminal* from other terminal-types is that the input data from other types of Terminals contain control characters that are Terminal specific. Thus, processing of the input data for each type of Terminal may be slightly different. In a global transaction or in a client/server mode of operation, the input data will be provided from a client application and not from a Terminal. Therefore, the input data will not contain the Terminal specific control characters and does not need to be processed as such.

Figure 7:
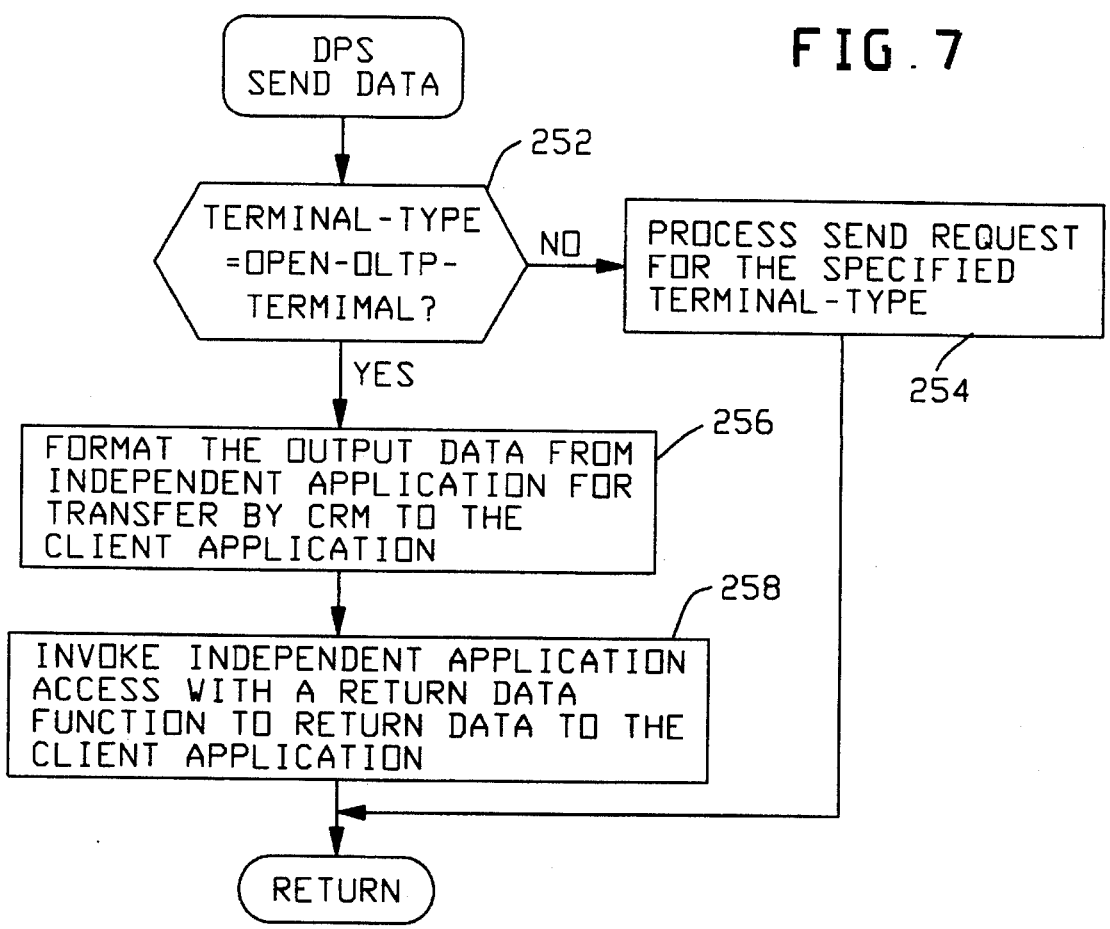
FIG 7 is a flowchart of the processing for the Send data function of the Display Processing System.

FIG. 7 is a flowchart of the processing for the Send data function of the Display Processing System. The Send data function is invoked by the Independent Application 112 to provide the output it has produced as a result of processing a transaction. At decision Step 252, it is determined whether the terminal-type is *Open-OLTP-terminal*. If the output is not directed to a Client Application 114, then the terminal-type will not be *Open-OLTP-terminal* and decision Step 252 will direct control to Step 254. Step 254 processes the send data request according to the specified type of Terminal.

If the output is directed to a Client Application 114, control is directed to Step 256. Step 256 formats the output data from the Independent Application 112 according to the requirements of the CRM 88 so that the CRM can transfer the output data to the Client Application. The Independent Application Access software 120 is invoked at Step 258 with a Return Data function. Independent Application Access software in turn invokes the CRM to effect the data transfer. After the data is transferred to the Client Application, control is returned to the Independent Application 112.

Figure 8:
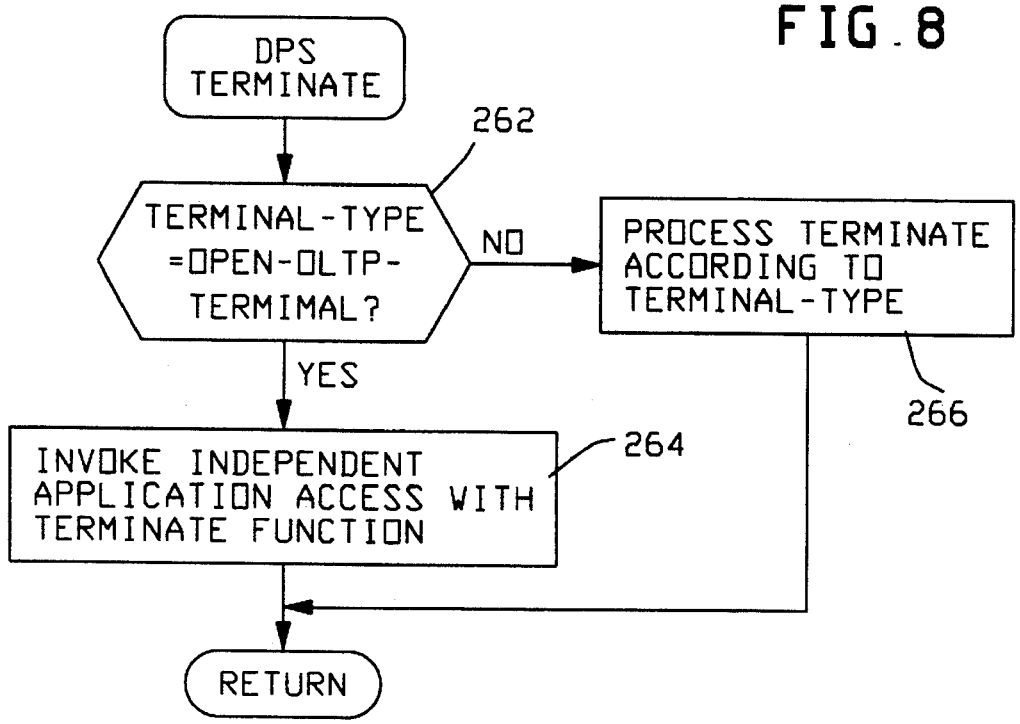
FIG. 8 is a flowchart of the processing performed by the Display Processing System for a Terminate request.

FIG. 8 is a flowchart of the processing performed by the Display Processing System for a Terminate request. If the terminal-type is *Open-OLTP-terminal*, decision Step 262 control is directed to Step 264. Otherwise, control is directed to Step 266. When the processing of a transaction by an Independent Application is associated with a Client Application 114, the DPS 128 must terminate with Open/OLTP-2200 116. Step 264 invokes Independent Application Access software 120 to terminate with Open/OLTP-2200. When a transaction is initiated from a Terminal 20, Step 266 processes the Terminate as in the prior art system of FIG. 1.

Figure 9B:
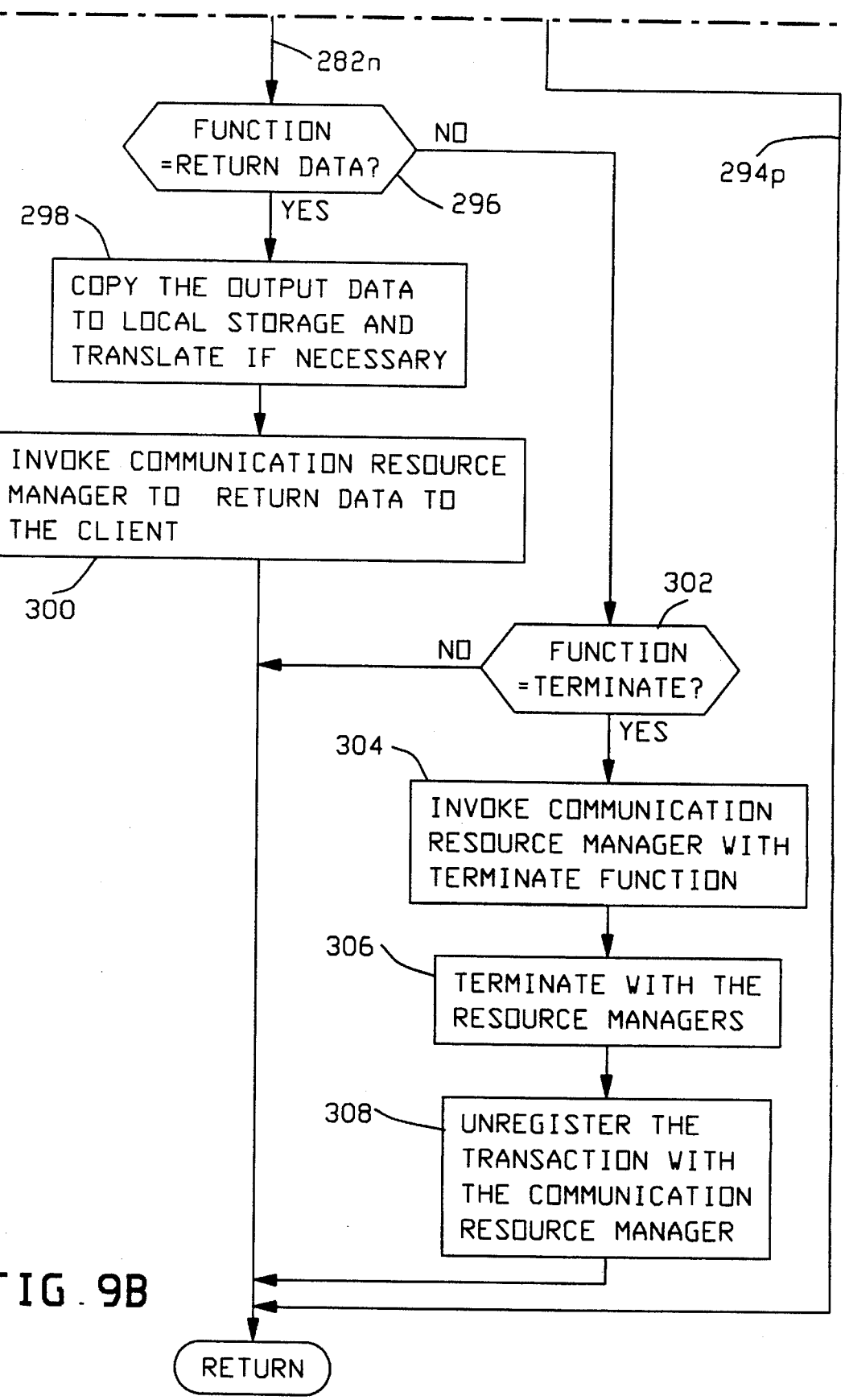

FIG. 9 illustrates the relationship between FIGS. 9A and 9B. FIGS. 9A and 9B are a flowchart of the processing performed by the Independent Application Access software. The Independent Application Access software 120 is a component that provides a programming interface to Open/OLTP-2200 116. For the purposes of the present invention, the Independent Application Access software is called by the DPS 128 so that an Independent Application 112 may be used without change as part of processing a global transaction.

Three basic functions are provided by Independent Application Access software 120 are: Initialize, Return Data, and Terminate. If the specified function is Initialize, decision Step 282 directs control to Step 284. The Independent Application 112 is started with a six character program name that identifies a particular program within the Application. Step 284 copies the program name to local storage. The program name is then provided to the CRM 88 and the TM 86 at Step 286 by invoking a registration function.

Step 288 invokes the TM 86 to open one or more databases. The databases to open are specified by the developer of a Client Application 114 in a configuration file. The TM uses the program name that was provided during the registration function to determine which databases to open. The result of Step 288 is to issue a Begin Transaction command to the DBMS 132. The Begin Transaction command to the DBMS specifies the Transaction Manager Interface that will control the transaction. The TM specifies *Open-OLTP* as the Transaction Manager Interface when it issues a Begin Transaction command to the DBMS. The DBMS associates the Transaction Manager Interface value with the specified transaction so that if the Independent Application 112 issues transaction control commands to the DBMS, the DBMS may selectively disregard them.

The data that is to be provided as input to the Independent Application 112 is obtained from the CRM 88 at Step 290. In contrast to the prior art transaction processing system of FIG. 1 where the DPS 22 obtains input data via the MCB 16, the modified DPS 128 obtains input from the CRM where the Independent Application is acting as a service routine.

Step 292 obtains the buffer type and buffer subtype from the Transaction Manager 86. The buffer type and subtype are used to specify the format of the data in the buffer, i.e., integers, characters, floating point, double precision, etc. The buffer types are described further in *Distributed Transaction Processing: The XATMI Specification, X/Open Company* Limited, U.K.

The input data is made available to the DPS 128 at Step 294. In addition to copying the input data to the working storage of the DPS, Step 294 translates the data if required. Translation is required if the client application supplies the data in 8-bit bytes because the DPS requires data in 9-bit bytes. After the data is copied, control Path 294p is followed and control is returned to DPS processing.

If the function code that is input to Independent Application Access software 120 is not Initialize, control is directed along control Path 282n to decision Step 296 to test for the Return Data function. If the function is Return Data, control is directed to Step 298 where the output data is copied to storage that is local to the Independent Application Access software 120 and translated to an 8-bit byte format if required. Step 300 invokes the CRM 88 to transfer the copied output data to the Client Application 114. Control is then returned to the DPS.

If the function code that is input to Independent Application Access software 120 is neither Initialize nor Return, control is directed to decision Step 302 to test whether the function code is Terminate. If the function code is not Terminate, control is returned to DPS. Otherwise, Step 304 invokes the CRM with the Terminate function. This signals to the CRM that the Independent Application has completed its processing of the subordinate transaction. The CRM 88 then awaits further instructions from the transaction manager that is providing the overall coordination of the transaction. In the case of a global transaction, the transaction manager may be executing on a separate data processing system. If the transaction processing performed by the Independent Application was part of a global transaction, control will not be returned to the Independent Application Access software until the two-phase commit processing is complete. As shown in FIG. 4, the CRM waits for prepare and commit indicators from the transaction manager.

At Step 306, the Independent Application Access software 120 invokes the Terminate function of the TM 86. The Terminate function causes the TM to terminate with the DBMS 132. The Unregister function of the CRM 88 is invoked by the Independent Application Access software at Step 308. The CRM may delete any control information for the transaction that it presently has stored. Control is then returned to the DPS 128.

The DBMS 132 of this exemplary embodiment supports the two-phase commit protocol as well as processing of transactions as described for Transaction Processing Application 24. The processing of a DBMS that supports two-phase commit is well recognized by those skilled in the art and a detailed discussion of such processing is not included here.

The DBMS of the exemplary embodiment provides transaction control commands that must be used by application software so that the DBMS can coordinate the processing of multiple transactions. For the purposes of the present invention, the transaction control commands that are of interest include: Begin Transaction, Commit Transaction, End Transaction, and Omit Transaction. Begin Transaction assigns a transaction identifier to the transaction for purposes of thread control; Commit Transaction makes visible to other transactions updates by a transaction specified by the transaction identifier; End Transaction frees the transaction identifier; and Omit transaction undoes any updates made as a result of the transaction specified by the transaction identifier.

Figure 10:
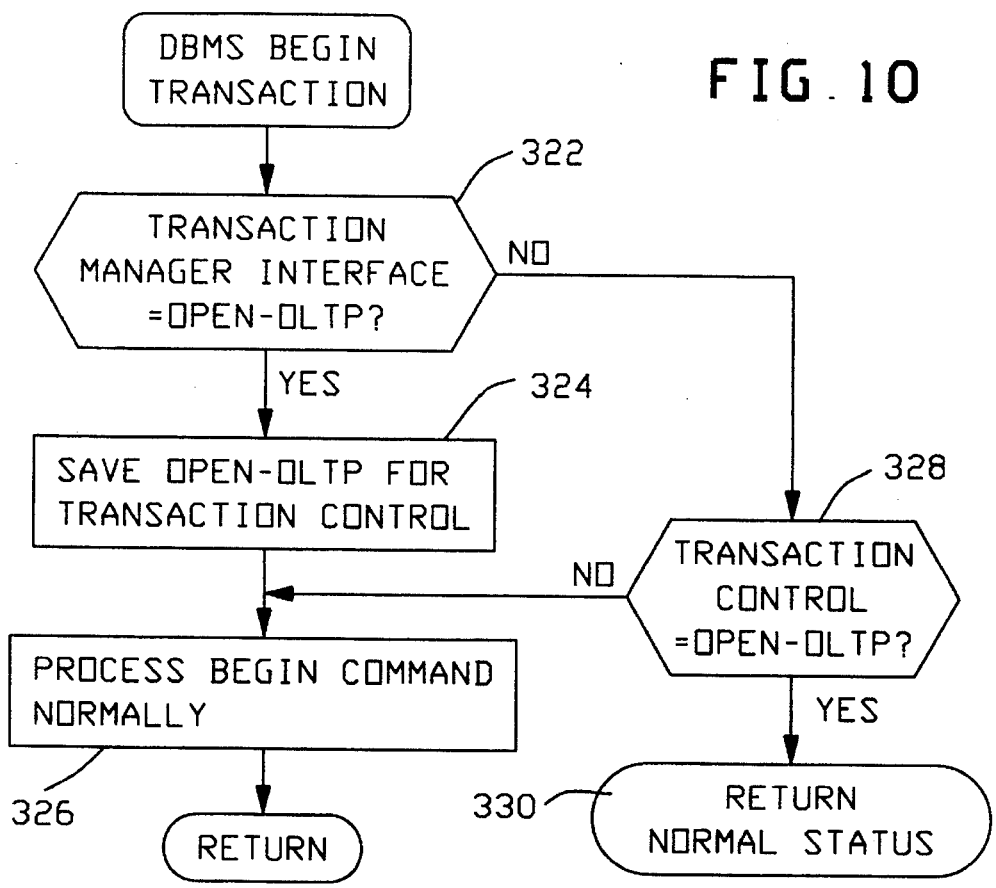
FIG. 10 is a flowchart of the processing performed by the DBMS for a Begin Transaction command.
Figure 11:
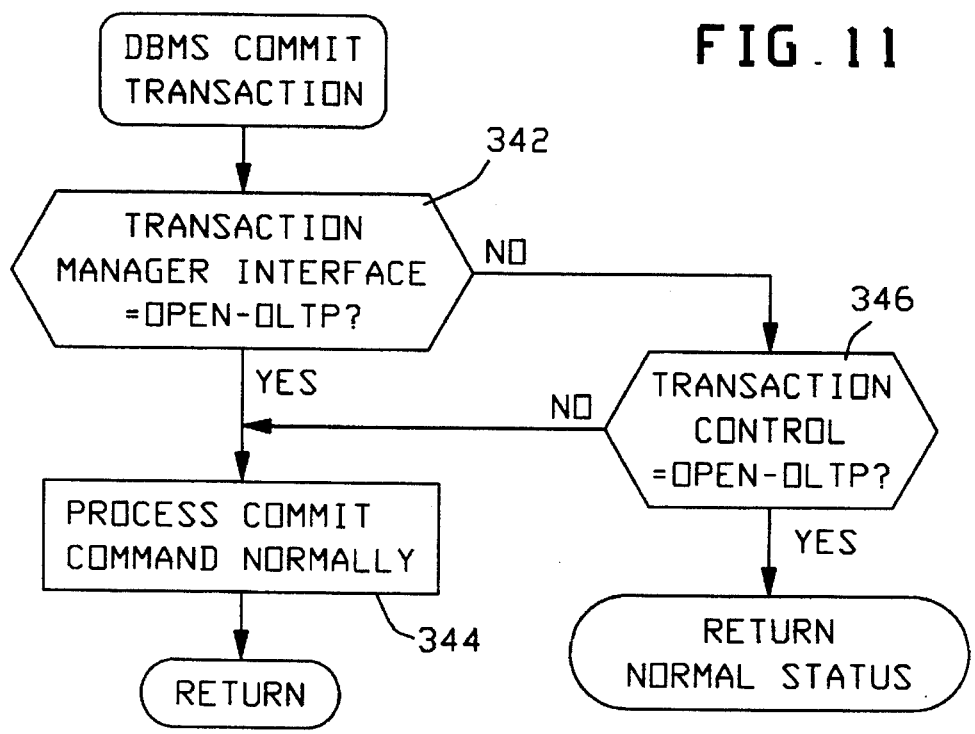
FIG. 11 is a flowchart of the processing performed by the DBMS for a Commit Transaction command.
Figure 12:
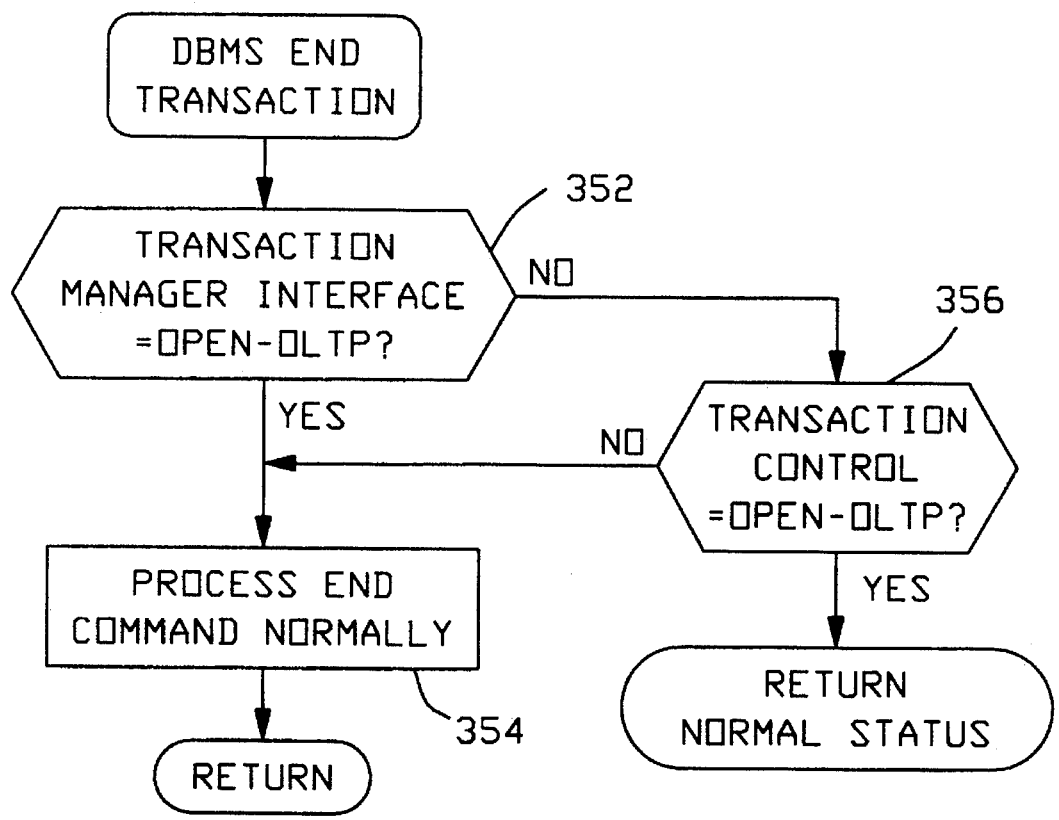
FIG. 12 is a flowchart of the processing performed by the DBMS for an End Transaction command.

To enable an Independent Application to be used as a callable service as part of a global transaction, the DBMS was modified to recognize whether transaction control should come from an Independent Application 112 or from a TM 86. In particular, if the transaction in process is not part of a global transaction, the transaction control commands that are issued from the Independent Application are processed as the Independent Application expects. However, if the transaction control commands are issued from the Independent Application and the transaction control should be provided by the TM, the transaction control commands issued from the Independent Application are selectively disregarded. An Omit command issued from an Independent Application is processed normally. FIGS. 10, 11, and 12 show the relevant processing of the DBMS to support the present invention.

FIG. 10 is a flowchart of the processing performed by the DBMS for a Begin Transaction command. The DBMS 132 expects a parameter from the calling software that indicates the type of Transaction Manager Interface. For Independent Applications 112, this parameter was available in the prior art DBMS but was unused. For calls from the TM 86, the Transaction Manager Interface parameter is set to *Open-OLTP*. This indicates to the DBMS that transaction control commands for the transaction in process will be supplied by the TM and that transaction control commands from the Independent Application may be selectively disregarded. Decision Step 322 tests whether the Transaction Manager Interface parameter is *Open-OLTP*. If so, control is directed to Step 324 where the *Open-OLTP* value is saved and associated with the transaction for which the Begin Transaction command was issued. Processing then proceeds to Step 326 to process the Begin Transaction command in a manner which is the same as the processing of a Begin Transaction command issued from a Transaction Processing Application 24 to the DBMS 14 of FIG. 1.

If the value of the Transaction Manager Interface parameter is not *Open-OLTP*, control is directed to decision Step 328. Decision Step 328 tests whether the *Open-OLTP* value has already been established for transaction control for the transaction identified by the Begin Transaction command. If not, control is directed to Step 326 as described above. This control path is taken when the Independent Application is providing transaction control and not the TM 86. If the *Open-OLTP* value has already been established for transaction control, then control is directed to Step 330 where control is returned to the Independent Application 112 with a normal status. This control path is followed when the TM is providing transaction control, i.e., the TM issued a Begin Transaction command before the Independent Application issued its Begin Transaction command.

FIG. 11 is a flowchart of the processing performed by the DBMS for a Commit Transaction command. The DBMS 132 detects whether transaction control for the transaction for which the Commit command is issued is being provided by the Independent Application 112 or by the TM 86. If transaction control is being provided by the TM, a Commit command from the Independent Application is disregarded. The DBMS waits until a Commit command is received from the TM. The Transaction Manager Interface parameter passed to the DBMS indicates whether the TM or the Independent Application has issued the command.

If decision Step 342 finds that the Transaction Manager Interface is *Open-OLTP*, control is directed to Step 344 where the Commit command is processed normally. The *Open-OLTP* value indicates that the TM is invoking the DBMS. If the Transaction Manager Interface parameter is not *Open-OLTP*, control is directed to decision Step 346 because the Independent Application 112 has issued the Commit command.

Decision Step 346 tests whether the transaction control is being performed by the TM 86 by checking whether *Open-OLTP* has been associated with the transaction specified in the Commit command. If so, transaction control is performed by the TM and transaction control commands from the Independent Application are disregarded; control is returned to the Independent Application along with a normal completion status. If the control for the transaction has not been established by the TM, decision Step 346 directs control to Step 344 for normal processing of the Commit command.

FIG. 12 is a flowchart of the processing performed by the DBMS for an End Transaction command. The DBMS 132 detects whether the End command is issued from an Independent Application 112 that is performing its processing under the control of the TM 86, and if so, ignores the End command. The DBMS waits until an End command is received from the TM 86. The Transaction Manager Interface parameter passed to the DBMS indicates whether the TM or the Independent Application has issued the command.

If decision Step 352 finds that the Transaction Manager Interface is *Open-OLTP,* control is directed to Step 354 where the End command is processed normally. The *Open-OLTP* value indicates that the TM is invoking the DBMS. If the Transaction Manager Interface parameter is not *Open-OLTP,* control is directed to decision Step 356 because the Independent Application 112 has issued the End command.

Decision Step 356 tests whether the transaction control for the transaction specified in the End command is being performed by the TM 86 by checking whether *Open-OLTP* has been associated with the transaction. If so, transaction control is performed by the TM and transaction control commands from the Independent Application should be selectively disregarded; control is returned to the Independent Application along with a normal completion status. If the control for the transaction has not been established by the TM, decision Step 356 directs control to Step 354 for normal processing of the End command.

FIG. 13 is a block diagram that shows the flow of control and the flow of data between a first data processing system with a client application and a second data processing system with an Independent Application that may be used both as a service routine for the Client Application and as a stand-alone application. Access to the transaction processing performed by the Independent Application 112 is available both through the Terminal 20 and the Client Application 114.

As described in FIG. 1, the Independent Application 112 is available via the Terminal 20. The Independent Application is equivalent to the Transaction Processing Application 24 of FIG. 1. The solid control flow lines and data flow lines are as described in FIG. 1.

The directional dashed lines of FIG. 12 show the flow of control from a Client Application 114 to an Independent Application 112 that the Client Application is using as a service routine. The untitled directional lines illustrate the flow of dam from the Client Application to the Independent Application and back to the Client Application.

The Client Application 114 executes on a Data Processing System 402 other than the Data Processing System 10 of the Independent Application 112. Depending upon the nature of the Client Application, the Data Processing System may be a workstation, mini-computer, or a mainframe. The Client Application may also initiate global transactions where there are subordinate transactions directed to applications other than the Independent Application.

To obtain the services of the Independent Application 112, the Client Application 114 provides input data and passes control, shown respectively by Lines 406 and 408, to the Open/OLTP software 404 of the client Data Processing System 402. The input data must match the input data that would be provided via the Terminal 20. The Open/OLTP software 404 implements the architecture as described in FIG. 2. Open/OLTP 404 forwards the input data to the Open/OLTP-2200 116 as shown by data flow Line 410. Hardware and software suitable for providing communication between the Open/OLTP software 404 and Open/OLTP-2200 116 may be obtained by those skilled in the art by reference to the following publications: The *ISO/IEC Open Systems Interconnection (OSI) Commitment, Concurrency, and Recovery (CC) standard,* ISO/IEC 9804.3 (1989) and ISO/IEC 9805.3 (1989); *ISO/IEC Information Technology—Open Systems Interconnection—Distributed Transaction Processing—Part 1:Model, Part 2:Service Definition, and Part 3:Protocol Specification,* respectively, 10026-1:(1992), 10026-2(1992), and 10026-3(1992). The CRM 88 of Open/OLTP-2200 receives the input data and the Message Control Bank 16 is invoked as shown by control Line 125 and as described in FIG. 3. While the data flow Line 410 shows data flowing directly from Open/OLTP 404 to Open/OLTP-2200 116, it should be understood that in the exemplary embodiment, the data actually flows through the CMS 18 of the Data Processing System 10. The implementation details for the communication between Open/OLTP 404 and Open/OLTP-2200 116 are beyond the scope of the present invention.

Control Line 34 shows control passing to the Operating System 12 for scheduling execution of the Independent Application 112 and control line 36 shows control passing to the Independent Application when the Independent Application is executing. As described in FIGS. 3 and 4, the Independent Application initializes with the DPS 128 as shown by control Line 130. The DPS in turn initializes with the MCB 16 as illustrated by control Line 152. The MCB provides the terminal-type to the DPS. If the terminal-type is *Open/OLTP-terminal,* the DPS initializes with Open/OLTP-2200 at control Line 134 to obtain the input data. Data flow Line 412 shows the transfer of input data to the DPS. The DPS holds the input data until a read of input data is requested by the Independent Application. Upon an initialize request from the DPS, Open/OLTP-2200 issues a Begin Transaction command to the DBMS to signal the beginning of a transaction that is managed by Open/OLTP-2200 instead of being managed by the Independent Application. Control Line 138 illustrates transaction control commands from Open/OLTP-2200 to the DBMS 132.

Once control is returned to the Independent Application 112, it issues DBMS query and update commands to satisfy the requirements of the input that was provided by the Client Application 114. Control Line 140 illustrates the DBMS commands issued by the Independent Application on behalf of the Client Application and data flow Line 414 shows the data flowing from the DBMS to the Independent Application. It should be noted that generally, transaction control commands that are issued from the Independent Application to the DBMS are disregarded if control for the transaction has already been established by the Open/OLTP-2200 116.

Once the Independent Application 112 has received any requested data or status information from the DBMS 132, the Independent Application issues a request to the DPS to send output data. Control Line 130 illustrates initiation of the send data request. If the terminal-type associated with the transaction is *Open/OLTP-terminal,* the output is directed to Open/OLTP-2200 116 as shown by data flow Line 416. The request from DPS to Open/OLTP-2200 to send output data is represented by control Line 134. Data flow Line 418 shows the transfer of data back to the client Data Processing System 402, and Dam flow Line 420 shows the transfer of output data from the client instance of Open/OLTP 404 to the Client Application 114. Because the client Open/OLTP 404 includes the Transaction Manager that maintains overall transaction control for a transaction initiated from the Client Application, the TM 86 of the Open/OLTP-2200 waits until it receives transaction control commands from the client Open/OLTP 404 before it issues transaction control commands to the DBMS.

Transaction processing applications represent a sizable investment for many businesses. In addition, the availability of the transaction processing application may determine whether the business is able to generate revenue. When this dependency on the transaction processing applications is coupled with the desire to remain competitive by offering new services, businesses are increasingly demanding that their investment in existing transaction processing applications be protected. More often than not, businesses are not interested in big-bang approaches to reinventing-the-wheel. The invention described herein protects the investment in existing transaction processing applications and allows the continued usage of existing transaction processing applications in new client/server environments.

Having described an exemplary embodiment of the invention in the drawings and accompanying description, those skilled in the art will recognize that various modifications to the exemplary embodiment could be made without departing from the scope and spirit of the claims set forth below:

We claim:

1. A client-server transaction processing system comprising:

a database management system;

an independent transaction processing application coupled to said database management system for providing access to a database and issuing transaction control commands to said database management system for a transaction;

a transaction manager for managing distributed transactions, coupled to said independent transaction processing application and coupled to said database management system for initiating said independent transaction processing application, controlling the processing of a distributed transaction, and providing to said database management system transaction control commands associated with distributed transactions;

a client application coupled to said transaction manager for initiating a distributed transaction with said transaction manager and issuing transaction control commands associated with said distributed transaction to said transaction manager, said distributed transaction resulting in initiation of said independent transaction processing application for processing a subordinate transaction of said distributed transaction, and said transaction control commands of said client application conflicting with transaction control commands of said independent transaction processing application; and selective control means coupled to said independent transaction processing application, coupled to said transaction manager, and coupled to said database management system for identifying transaction control commands issued from said independent transaction processing application and transaction control commands issued from said client application, and selectively disregarding transaction control commands which are associated with said distributed transaction and which are issued by said independent transaction processing application.

2. The system of claim 1, further comprising:

transaction input-output means coupled to said independent transaction processing application and coupled to said transaction manager for providing input to and directing output from said independent transaction processing application, and for distinguishing whether output data from said independent transaction processing application is directed to said client application, and directing said output data to said transaction manager if said output data is for said client application, wherein said transaction manager provides input from said client application for said independent transaction processing application to said transaction input-output means.

3. The system of claim 2, further comprising indicator means coupled to said transaction manager for indicating that input for said service request is from said transaction manager and output of said independent transaction processing application from processing said service request is to said transaction manager.

4. The system of claim 2, further comprising access means coupled to said transaction manager and coupled to said transaction input-output means for initiating transaction control by said transaction manager.

5. The system of claim 2, further comprising:

indicator means coupled to said transaction manager for indicating that input for said service request is from said transaction manager and output of said independent transaction processing application from processing said service request is to said transaction manager; and access means coupled to said transaction manager and coupled to said transaction input-output means for initiating transaction control by said transaction manager.

6. A client-server transaction processing system, comprising:

a database management system;

an independent transaction processing application coupled to said database management system for providing access to a database and issuing transaction control commands to said database management system for a transaction;

initiation means coupled to said independent transaction processing application for initiating said independent transaction processing application;

a transaction manager far managing distributed transactions, coupled to said initiation means and coupled to said database management system for controlling the processing of a transaction and for providing to said database management system transaction control commands associated with distributed transactions;

a client application coupled to said transaction manager for initiating a distributed transaction with said transaction manager and issuing transaction control commands associated with said distributed transaction to said transaction manager, said service request resulting in initiation of said independent transaction processing application for processing a subordinate transaction of said distributed transaction, and said transaction control commands of said client application conflicting with transaction control commands of said independent transaction processing application;

terminal means coupled to said initiation means for initiating a request for processing a transaction and for providing input and receiving output associated with processing said transaction;

selective control means coupled to said independent transaction processing application, coupled to said transaction manager, and coupled to said database management system for identifying transaction control commands issued from said independent transaction processing application and transaction control commands issued from said transaction manager, and for distinguishing whether said independent transaction processing application is processing a subordinate transaction of said distributed transaction, and disregarding transaction control commands from said independent transaction processing application if said independent transaction processing application is processing a subordinate transaction of said distributed transaction; and output direction means coupled to said independent transaction processing application, coupled to said terminal means, and coupled to said transaction manager for directing output from said independent transaction processing application to said terminal means if said independent transaction processing application is processing a transaction, and to said client application if said independent transaction processing application is processing a subordinate transaction of said distributed transaction.

7. The system of claim 6, further comprising:

transaction input-output means coupled to said independent transaction processing application and coupled to said transaction manager for providing input to and directing output from said independent transaction processing application, and for distinguishing whether output dam from said independent transaction processing application is directed to said client application, and directing said output data to said transaction manager if said output data is for said client application, wherein said transaction manager provides input from said client application for said independent transaction processing application to said transaction input-output means.

8. The system of claim 7, further comprising indicator means coupled to said transaction manager and coupled to said initiation means for indicating to said initiation means that input for the said service request is from said transaction manager and output of said independent transaction processing application from processing said service request is to said transaction manager.

9. The system of claim 7, further comprising access means coupled to said transaction manager and coupled to said transaction input-output means for initiating transaction control by said transaction manager.

10. The system of claim 7, further comprising:

indicator means coupled to said transaction manager and coupled to said initiation means for indicating to said initiation means that input for said service request is from said transaction manager and output of said independent transaction processing application from processing said service request is to said transaction manager; and access means coupled to said transaction manager and coupled to said transaction input-output means for initiating transaction control by said transaction manager.

11. In a transaction processing system having an independent transaction processing application programmed for issuing transaction control commands to a database management system, a display processing system coupled to the independent transaction processing application for receiving input to and directing output from the independent transaction processing application, a transaction manager coupled to a client application and coupled to the display processing system for managing control of and input and output for a distributed transaction initiated by the client application, a method for using the independent transaction processing application as a server for the client application, where the client application and the independent transaction processing application issue conflicting transaction control commands, comprising the steps of:

initiating a distributed transaction from a client application with a transaction manager, wherein said distributed transaction includes a subordinate transaction to be processed by the independent transaction processing application;

establishing with the display processing system that input for said distributed transaction is provided by the transaction manager and the transaction manager is to receive output associated with processing said distributed transaction;

establishing with the database management system transaction control of said distributed transaction by the transaction manager;

starting the independent transaction processing application to process said subordinate transaction;

obtaining input for said distributed transaction from the transaction manager;

selectively disregarding transaction control commands issued to the database management system from the independent transaction processing application for said subordinate transaction;

processing transaction control commands issued to the database management system from the transaction manager;

providing output from the independent transaction processing application to the transaction manager.

12. The method of claim 11, wherein said establishing with the display processing system step includes the step of providing a transaction manager terminal-type to the display processing system to indicate that input for said service request is provided by the transaction manager and the transaction manager is to receive output associated with processing said service request.

13. The method of claim 11, wherein said establishing transaction control step includes the step of providing a control-source indicator to the database management system from the transaction manager.

14. The method of claim 11, wherein, said establishing with the display processing system step includes the step of providing a transaction manager terminal-type to the display processing system to indicate that input for said service request is provided by the transaction manager and the transaction manager is to receive output associated with processing said service request; and said establishing transaction control step includes the step of providing a control-source indicator to the database management system from the transaction manager.

15. In a transaction processing system having an independent transaction processing application programmed for issuing transaction control commands to a database management system, a terminal for providing input to and receiving output from the independent transaction processing application for a transaction initiated at the terminal, a display processing system coupled to the terminal and coupled to the independent transaction processing application for providing input to and directing output from the independent transaction processing application, a transaction manager coupled to a client application and coupled to the display processing system for managing control of and input and output for a distributed transaction initiated by the client application, a method for using the independent transaction processing application as a server for the client application while the independent transaction processing application is available to process transactions initiated at the terminal, where the client application and the independent transaction processing application issue conflicting transaction control commands for the distributed transaction, comprising the steps of:

(a) initiating a distributed transaction from a client application with a transaction manager, wherein said distributed transaction includes a subordinate transaction to be processed by the independent transaction processing application;

(b) initiating from a terminal a terminal-transaction to process by the independent transaction processing application;

(c) establishing with the display processing system that input for said distributed transaction is provided by the transaction manager and the transaction manager is to receive output associated with processing said distributed transaction;

(d) establishing with the display processing system that input for said terminal-transaction is provided by the terminal and the terminal is to receive output associated with processing said terminal-transaction;

(e) establishing with the database management system transaction control of said distributed transaction by the transaction manager;

(f) establishing with the database management system transaction control of said terminal-transaction by the independent transaction processing application;

(g) starting the independent transaction processing application to process said distributed transaction;

(h) starting the independent transaction processing application to process said terminal-transaction;

(i) obtaining input for said distributed transaction from the transaction manager;

(j) obtaining input for said terminal-transaction from the terminal;

(k) selectively disregarding transaction control commands issued to the database management system from the independent transaction processing application for said distributed transaction;

(l) processing transaction control commands issued to the database management system from the transaction manager for said distributed transaction;

(m) processing transaction control commands issued to the database management system from the independent transaction processing application for said terminal-transaction;

(n) providing output associated with processing said distributed transaction to the transaction manager; and (o) providing output associated with processing said terminal-transaction to the terminal.

16. The method of claim 15, wherein, said establishing step (c) includes the step of providing a transaction manager terminal-type to the display processing system to indicate that input for said service request is provided by the transaction manager and the transaction manager is to receive output associated with processing said service request; and said establishing step (d) includes the step of providing a terminal terminal-type to the display processing system to indicate that input for said transaction is provided by the terminal and the terminal is to receive output associated with processing said transaction.

17. The method of claim 15, wherein, said establishing transaction control step (e) includes the step of providing a transaction manager control-source indicator to the database management system from the transaction manager.

18. The method of claim 15, wherein, said establishing step (c) includes the step of providing a transaction manager terminal-type to the display processing system to indicate that input for said service request is provided by the transaction manager and the transaction manager is to receive output associated with processing said service request;

said establishing step (d) includes the step of providing a terminal terminal-type to the display processing system to indicate that input for said transaction is provided by the terminal and the terminal is to receive output associated with processing said transaction; and said establishing transaction control step (e) includes the step of providing a transaction manager control-source indicator to the database management system from the transaction manager.

19. In a transaction processing system having an independent transaction processing application programmed for issuing transaction control commands to a database management system, a transaction manager for managing distributed transactions and coupled to a client application for managing control of and input and output for a distributed transaction initiated by the client application, the distributed transaction comprised of one or more subordinate transactions, a method for usage of the independent transaction processing application to process a subordinate transaction of the distributed transaction, where the transaction control commands far the distributed transaction which are issued by the client application conflict with the transaction control commands for the subordinate transaction which are issued by the independent transaction processing application, comprising the steps of:

establishing with the database management system that transaction control for a distributed transaction is controlled by the transaction manager;

selectively disregarding transaction control commands that are associated with the subordinate transaction and that are issued to the database management system from the independent transaction processing application; and processing transaction control commands that are associated with the distributed transaction and that are issued to the database management system from the transaction manager.

20. In a transaction processing system having an independent transaction processing application programmed for issuing transaction control commands to a database management system, a transaction manager for managing distributed transactions and coupled to a client application for managing control of and input and output for a distributed transaction initiated by the client application, the distributed transaction comprised of one or more subordinate transactions, an apparatus permitting usage of the independent transaction processing application to process a subordinate transaction of the distributed transaction, where the transaction control commands for the distributed transaction which are issued by the client application conflict with the transaction control commands for the subordinate transaction which are issued by the independent transaction processing application, comprising:

means for establishing with the database management system that transaction control for a distributed transaction is controlled by the transaction manager;

means for selectively disregarding transaction control commands that are associated with the subordinate transaction and that are issued to the database management system from the independent transaction processing application; and means for processing transaction control commands that are associated with the distributed transaction and that are issued to the database management system from the transaction manager.

* * * * *